United States Patent [19]
Takahara et al.

[11] Patent Number: 6,005,651
[45] Date of Patent: *Dec. 21, 1999

[54] DISPLAY PANEL AND PROJECTION DISPLAY SYSTEM WITH USE OF DISPLAY PANEL

[75] Inventors: Hiroshi Takahara, Neyagawa; Hideki Ohmae, Suita; Hideaki Mochizuki, Osaka, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/586,418

[22] Filed: Jan. 16, 1996

Related U.S. Application Data

[63] Continuation of application No. 08/102,046, Aug. 4, 1993.

[30] Foreign Application Priority Data

| Aug. 4, 1992 | [JP] | Japan | 4-207761 |
| Aug. 25, 1992 | [JP] | Japan | 4-224484 |
| Apr. 22, 1993 | [JP] | Japan | 5-095828 |

[51] Int. Cl.$^6$ ............ G02F 1/1343; G02F 1/1335; G02F 1/137; G02F 1/136; G02F 1/1333

[52] U.S. Cl. ............ 349/137; 349/7; 349/8; 349/10; 349/35; 349/41; 349/42; 349/44; 349/86; 349/106; 349/110; 349/138; 349/139; 349/162

[58] Field of Search ............ 359/52, 66, 98, 359/96, 40, 41, 67, 68, 51, 71, 74, 59, 87; 349/7, 8, 10, 35, 41, 42, 44, 86, 106, 110, 138, 139, 162, 137

[56] References Cited

U.S. PATENT DOCUMENTS

| 4,688,900 | 8/1987 | Doane et al. | 359/94 |
| 4,869,576 | 9/1989 | Aoki et al. | 359/59 |
| 4,904,056 | 2/1990 | Castleberry | 359/62 |
| 4,964,702 | 10/1990 | Sugimoto et al. | 359/68 |
| 4,989,954 | 2/1991 | Yokoyama et al. | 359/40 |
| 5,026,143 | 6/1991 | Tanaka et al. | 359/59 |
| 5,028,121 | 7/1991 | Baur et al. | 359/41 |
| 5,105,289 | 4/1992 | Sonehara et al. | 359/70 |
| 5,148,298 | 9/1992 | Shigeta et al. | 359/74 |
| 5,150,234 | 9/1992 | Takahashi et al. | 359/41 |
| 5,153,752 | 10/1992 | Kurematsu et al. | 359/41 |
| 5,161,042 | 11/1992 | Hamada | 359/41 |
| 5,251,071 | 10/1993 | Kusukawa et al. | 359/68 |
| 5,299,289 | 3/1994 | Omae et al. | 359/51 |
| 5,477,351 | 12/1995 | Takahara et al. | 359/51 |
| 5,673,127 | 9/1997 | Takahara | 359/40 |
| 5,712,693 | 1/1998 | Miyatake et al. | 349/137 |
| 5,737,050 | 4/1998 | Takahara et al. | 349/122 |

FOREIGN PATENT DOCUMENTS

| 54-139569 | 10/1979 | Japan | 349/5 |
| 1-243020 | 9/1989 | Japan . | |
| 4-60538 | 2/1992 | Japan . | |
| 4-147215 | 5/1992 | Japan | 349/5 |

*Primary Examiner*—William L. Sikes
*Assistant Examiner*—Julie Ngo
*Attorney, Agent, or Firm*—Wenderoth, Lind & Ponack, L.L.P.

[57] ABSTRACT

In a display panel, a first substrate is opposed to a second substrate and interposing a liquid crystal/resin composite layer. If the display panel is a transmission type display, a film for absorbing light is formed on a black matrix and between pixel electrodes. If the display panel is a reflection type display, a film for absorbing light is formed between reflection electrodes. Further, a counterelectrode is made from a multi-layer film of dielectric films and a transparent electrically conductive film for preventing reflection. The film for absorbing light includes pigments which can absorb light modulated by the liquid crystal/resin composite layer. By using the display panel, a projection display system of high contrast and high brightness can be constructed.

29 Claims, 21 Drawing Sheets

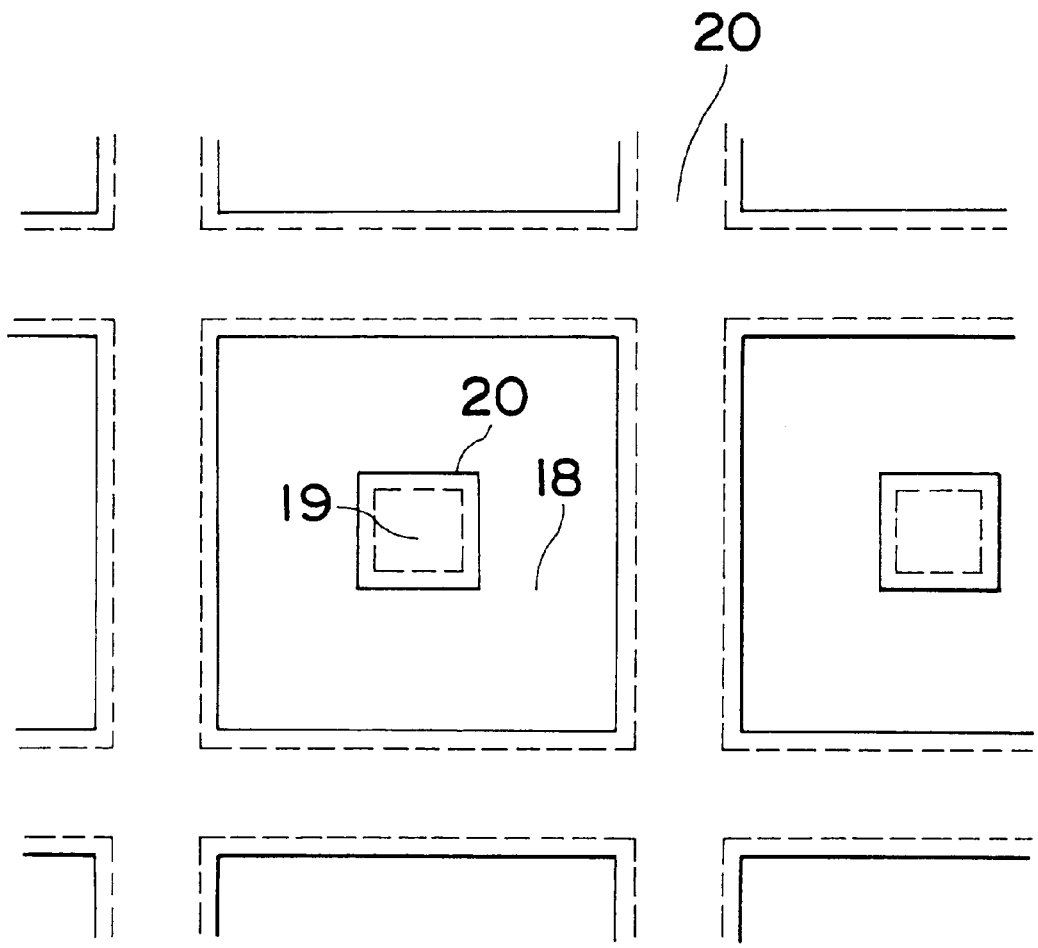

DISPLAY PANEL AND PROJECTION DISPLAY SYSTEM WITH USE OF DISPLAY PANEL

This application is a Continuation of now abandoned application Ser. No. 08/102,046, filed Aug. 4, 1993.

BACKGROUND OF THE INVENTION

1. Field of the Invention

The present invention relates to a display panel for modulating an incident light to form an optical image by controlling the scattering due to the liquid crystal and a projection display system which uses the display panel as a light valve and amplifies an image displayed on the display panel.

2. Description of the Prior Art

A display device employing a liquid crystal display panel has been researched and developed widely because of its compact size and its light weight. Recently, pocket television sets employing a twisted nematic (TN) mode liquid crystal display panel have been used practically. Furthermore, projection television systems, viewfinders and the like using a liquid crystal display panel as a light valve have also been used practically.

However, a TN mode liquid crystal display panel which uses the chirality of liquid crystals has disadvantages such as low brightness of display because two polarization plates are needed for light modulation. Furthermore, fabrication steps are complex. For example, rubbing is needed in order to align liquid crystal molecules. Recently, display panels using liquid crystal/resin composite have attracted attention because they need no polarizing plates and no rubbing step on fabrication. U.S. Pat. No. 4,435,047 discloses a display panel using liquid crystal/resin composite, and U.S. Pat. No. 4,613,207 discloses a projection display system which uses a display panel including a liquid crystal/resin composite as a light valve.

However, there remains problems before such a display panel of liquid crystal/resin composite can be used practically. One of the problems is that light reflected from a pixel propagates or leaks to adjacent pixels. This makes the contour of a pixel unclear. This problem is more important for a black and white image displayed with very small pixels. That is, a pixel of black or white becomes gray due to light scattered from adjacent pixels.

In a fabrication technique disclosed in Japanese Patent Laid-Open Publication 4-84121/1992, black walls made of a saturated hydrocarbon are formed between pixel electrodes on the source lines for applying a voltage to the pixels. Light scattered from a pixel is absorbed by the black walls to prevent the leakage of light to adjacent pixels. However, the thickness of the liquid crystal/resin composite must be 10 $\mu$m or more, and this means that the height of the walls have to be at least as high as about 10 $\mu$m. It may be possible to form such a wall by using a print technique. However, it is impossible to form such a wall for a display panel with one million pixels or more in an effective display area of a size of three inches or the like. In such a display panel, the pixel size is about 50 $\mu$m and the distance between them is about 5 $\mu$m. Therefore, the wall has a width of about 5 $\mu$m and a height of about 10 $\mu$m. The width of 5 $\mu$m cannot be produced with a pattern print technique. Such a small width may be realized with a deposition technique such as sputtering, but the height of about 10 $\mu$m cannot be realized by the technique. Furthermore, is also a problem that the wall is made of a hydrocarbon material because a hydrocarbon material may have a bad insulating property. Because the wall is formed between a pixel electrode and a counterelectrode, the insulation between the two electrodes may be deteriorated. Furthermore, the hydrocarbon may react with a component of the liquid crystal or deteriorate the liquid crystal.

SUMMARY OF THE INVENTION

An object of the present invention is to provide a display panel with a liquid crystal/composite resin for displaying a very fine image of high contrast.

Another object of the present invention is to provide a projection display system which can project a very fine image of high contrast.

In a display panel according to the present invention, an optical modulation layer comprising a liquid crystal/resin composite is interposed between first and second substrates wherein at least one of the first and second substrates is made of a transparent material. Further, an optical absorption member for absorbing light rays is formed on at least one of the first and second substrates in contact with a liquid crystal/resin composite. The optical absorption member includes pigments which absorb light to be modulated by the optical modulation member, and preferably the pigments have a color compliment to the color modulated by the optical modulation layer. Thus, the optical absorption member can absorb the light scattered in the optical modulation layer and the leakage of light can be prevented.

As to a transmission type display panel, the optical absorption member is formed on at least one of a shading pattern (or black matrix) formed between pixel electrodes on the first substrate or a shading pattern formed on the second substrate.

As to a reflection type display panel, the optical absorption member is formed between reflection electrodes of matrix-like pattern or on a reflection member such as a dielectric mirror on a first substrate. Further, a multi-layer film is formed on a counterelectrode formed on a second substrate opposed to the reflection member. The multi-layer film may comprise a dielectric film of an optical thickness of about $\lambda/4$ and a transparent electrically conducting film having of an optical thickness of about $\lambda/2$ to apply an electric field to the optical modulation layer wherein $\lambda$ denotes the wavelength of light, and the refractive index $n_1$ of the dielectric film is between 1.5 and 1.7. Preferably, the multi-layer film may be a three-layer film comprising first and second dielectric layers of an optical thickness of about $\lambda/4$ and an electrically conducting film or electrode of an optical thickness of about $\lambda/2$ interposed between the first and second dielectric layers, and the refractive index $n_1$ of the dielectric films is between 1.6 and 1.8. The multi-layer film prevents the reflection of light and applies an electric field to the optical modulation layer.

A film for absorbing light made from a black paint or the like is formed on an ineffective area (the area except an effective display area). The film can absorb light scattered in the optical modulation layer and reflected at an interface between the substrate and air so that the contrast of the display can be improved.

In a projection display system according to the present invention, a display panel explained above is used as; a light valve. The display panel may be a transmission type or a reflection type. The display panel modulates the incident light, and the modulated light is projected by an optical system on a screen. In order to display a color image, three display panels are used for three colors of an image.

An advantage of a display panel of the present invention is that the brightness of image is high and that the contrast of the image is improved.

Another advantage of a display panel of the present invention is that thin film transistors can be prevented from being illuminated by light so that the photoconductor phenomenon can be prevented.

An advantage of a projection display system of the present invention is that the brightness of the projected image is high and the contrast of the image is improved.

BRIEF DESCRIPTION OF THE DRAWINGS

These and other objects and features of the present invention will become clear from the following description taken in conjunction with the preferred embodiments thereof with reference to the accompanying drawings, and in which:

FIG. 3 is a plan view of the display panel;

DETAILED DESCRIPTION OF THE PREFERRED EMBODIMENTS

Figure 1A:
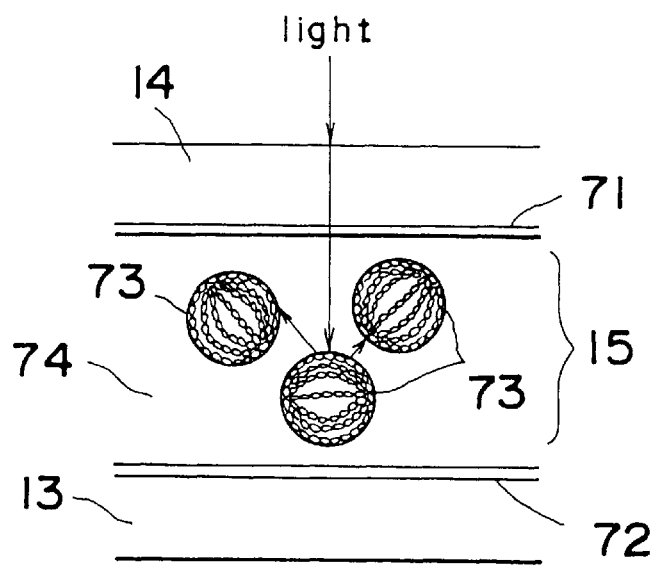
FIGS. 1(a) and 1(b) are diagrams illustrating a liquid crystal/resin composite.

Referring now to the drawings, wherein like reference characters designate like or corresponding parts, embodiments of the present invention will be explained below.

A liquid crystal/resin composite is a composite of a liquid crystal component and a resin component, and the liquid crystal component extends into the matrix made of the resin (polymer) component. The structure of the liquid crystal/resin composite changes according to the ratio of the liquid crystal component to the resin component, and is classified typically into two types according to the ratio of the liquid crystal component to the polymer (resin) component. In one type of composite having a small ratio of the liquid crystal component, droplets of liquid crystal are dispersed in the voids of the resin layer, and the liquid crystal exists discontinuously, as shown schematically in FIGS. 1(a) and 1(b). This type is called a polymer dispersed liquid crystal. If the amount of the liquid crystal component is increased, droplets contact each other to form a continuous phase. In the other type of composite having a large ratio of liquid crystal component, a network of resin component is formed and the liquid crystal exists not as droplets, but extends with the network continuously. This structure is analogous to a sponge impregnated with liquid crystal. This type is called a polymer network liquid crystal.

Figure 1B:
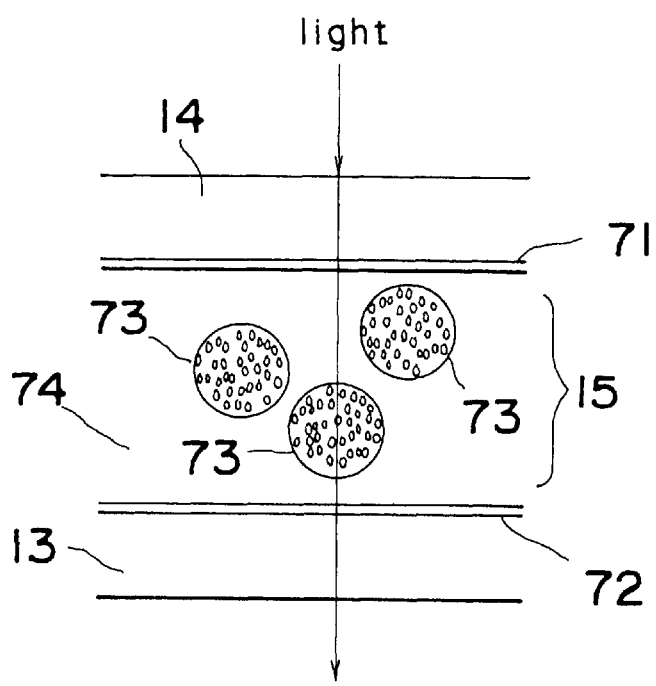

The above-mentioned two types of liquid crystal/polymer composites can be used to display an image by controlling the scattering and transmission of light. A display panel using the polymer dispersed liquid crystal uses a property that the refractive index of the liquid crystal varies with the orientation direction of the liquid crystal molecules. FIG. 1(a) shows schematically a polymer dispersion liquid crystal layer 15 interposed between substrate 13 with pixel electrodes 72 connected to thin film transistors (not shown) and another substrate 14 with a counterelectrode 71. The polymer dispersion liquid crystal 15 comprises liquid crystal droplets 73 in the resin matrix 74. Without applying a voltage to the liquid crystal 15, the liquid crystal molecules in the droplets 73 align in irregular directions, as shown in FIG. 1(a). In this scattering state, a difference in refractive index exists between the liquid crystal droplets 73 and the resin 74 to scatter the incident light. By applying a voltage to the liquid crystal 15, the liquid crystal molecules are aligned in a direction, as shown in FIG. 1(b). If the refractive index of the liquid crystal component oriented in the direction is controlled preliminarily to coincide with that of the resin component, the incident light is not scattered in the liquid crystal, but is transmitted through it. On the other hand, the polymer network liquid crystal uses the irregularity itself of the orientation of the liquid crystal molecules for scattering the light. In the irregular orientation state, or without applying a voltage to the liquid crystal, the incident light is scattered through the liquid crystal, while when the molecules align in a direction by applying a voltage to the liquid crystal, the light is transmitted through the liquid crystal. The above-mentioned liquid crystal/resin composite does not need a polarizer and an analyzer on modulating the light. Therefore, it can display an image at a high luminance which is two or more times as high as a display panel using a twisted nematic liquid crystal.

Figure 2A:
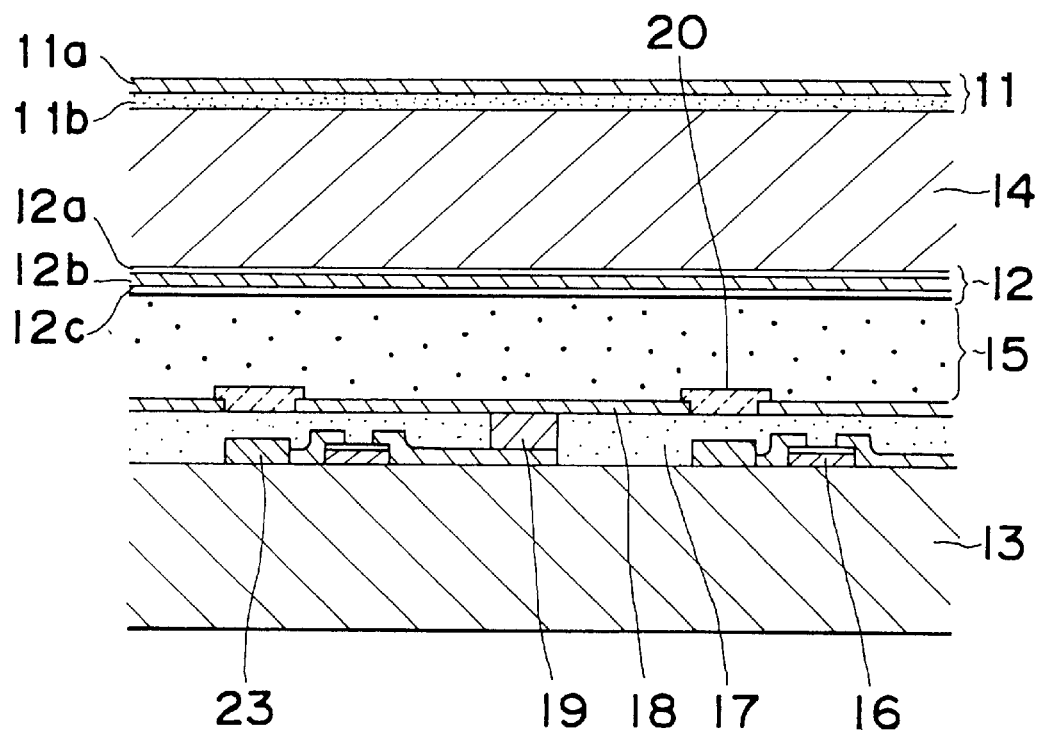
FIGS. 2(a) and 2(b) are schematic sectional views of display panels of an embodiment of the present invention.

FIG. 2(a) shows a display panel according to a first embodiment of the present invention schematically. The display panel comprises a liquid crystal layer 15 interposed between an array substrate 13 and a counterelectrode substrate 14. The counterelectrode substrate 14 is made of a glass of 1 mm thickness and having a refractive index of 1.52 and having a three-layer counterelectrode 12 formed thereon. Thin film transistors 16 for applying signals to refection electrodes 18, source signal lines 23 for transmitting signals to the thin film transistors 16 and the like are formed on the array substrate 13, and an insulating film 17 and reflection electrodes 18 made of aluminum are further applied successively on the array substrate. A terminal of a thin film transistor 16 is connected to a relevant reflection electrode 18 through a contact 19 formed in the insulating film 18. The insulating film 17 may be made of an organic material such as polyimide or an inorganic material such as $SiO_2$ or $SiN_x$. The reflection electrodes 18 have mirror planes formed by polishing the surface thereof after the patterning.

The distance between the counterelectrode 12 and reflection electrodes 18 is kept at a predetermined distance by using beads (not shown) or the like, and a liquid crystal layer 15 is filled between them. The liquid crystal layer 15 is made of a liquid crystal/resin composite which scatters or transmits the incident light according to the applied voltage. The incident light does not need to be a polarized light and the brightness of the display two or more times that of a twisted nematic type display panel.

In the preparation of the liquid crystal/resin composite, independent particle-like droplets of liquid crystals are formed in a resin layer when the amount of the liquid crystal component is smaller than that of the resin component. On the other hand, when the amount of liquid crystal component is larger than that of the resin component, a resin matrix or polymer network is formed in the liquid crystal material as a continuous layer. Although a display panel using the polymer dispersed liquid crystal has been chosen as an example in the following embodiments for simplicity of the explanation, either of the display panels using a polymer dispersed liquid crystal or a polymer network liquid crystal can be used in the present invention to display an image by controlling the scattering and transmission of light in the present invention.

Preferably, the liquid crystal component for the panel is a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals are preferable because they have a large difference between the ordinary refractive index no and the extraordinary one $n_e$. A nematic liquid crystal of fluoride having a good resistance to light and heat is preferable.

Preferably, the resin material is a transparent resin, and any thermoplastic resin, thermosetting resin, or photo-setting resin may be used. An ultraviolet-setting resin such as an ultraviolet-setting acrylic resin is preferable because it can be easily used in the production of a panel and well separated from the liquid crystal phase. Particularly, a resin is preferable which contains acrylic monomers or acrylic oligomers which can be polymerized and set by ultraviolet ray irradiation.

A monomer for the polymer phase (resin) may be 2-ethylhexyl acrylate, 2-hydroxyethyl acrylate, neopentyl glycol dicrylate, hexanediol diacrylate, diethylene glycol diacrylate, tripropylene glycol diacrylate, polyethylene glycol diacrylate, trimethylol propane triacrylate, pentaerythritol acrylate or the like. An oligomer or prepolymer for the polymer phase may be polyester acrylate, epoxy acrylate, polyurethane acrylate or the like.

In order to enhance the polymerization rate, a polymerization initiator may be used such as a 2-hydroxy-2-methyl-1-phenylpropane-1-on ("DAROCURE 1173" available from Merck & Corp.), 1-(4-isopropylphenyl)-2-hydroxy-2-methylpropane-1-on ("DAROCURE 1116" available from Merck & Corp. Inc.), 1-hydroxy cyclohexyl phenylketone ("Irgacure 651" available from Ciba-Geigy Ltd.) or the like.

Furthermore, a chain transfer agent, a photosensitizer, a dye agent, a crosslinking agent or the like may be appropriately incorporated as an additional ingredient.

A liquid crystal is dissolved homogeneously in an ultraviolet ray setting resin to form a liquid or viscous mixture. The refractive index of the liquid crystal component oriented in the direction is selected to coincide with that of the resin component. The mixture is injected between the two substrates 13 and 14, and next it is irradiated with ultraviolet rays. Thus, only the resin material is isolated to form a liquid crystal/resin composite 15.

The ratio of the liquid crystal component to the resin component in the liquid crystal/resin composite is generally 20 to 90 wt %, preferably 50–85 wt %. If the ratio is less than 20 wt %, the amount of liquid crystal droplets is small so that the effect of a change of the refractive index is small. On the other hand, if the ratio is more than 90 wt %, there is a tendency that the resin component and the liquid crystal component are separated from each other into top and bottom layers, so that the ratio of the interface decreases to lower the scattering property of the liquid crystal layer.

The thickness of the liquid crystal layer 15 is selected to be between 5 to 25 $\mu$m and preferably between 8 to 15 $\mu$m. If the thickness is smaller, the scattering characteristic and the contrast become worse, while if the thickness is larger, the applied voltage of the liquid crystal layer has to be increased and this makes it difficult to design a drive circuit.

The reflection electrodes 18 are made of aluminum. If they are made of chromium, the reflectance of chromium is lower than that of aluminum and problems arise due to the hardness of chromium.

The connection terminals 19 of the reflection electrodes 18 have recesses of 0.5–1 $\mu$m of depth. However, the alignment processing is not needed for a liquid crystal/resin composite and no problem on the alignment arises due to the recesses in contrast to a twisted nematic liquid crystal. The aperture ratio is 80% or more for a pixel of 100 $\mu$m square and 70% or more even for a pixel of 50 $\mu$m square. However, the reflectance of the reflection electrodes 18 decreases more or less above the thin film transistors 16 because the patterns of thin film transistors 16 are transferred. In order to eliminate the unevenness of the surfaces of the reflection electrodes 18, the surfaces may be polished to smooth the reflection electrodes 18 or to attain the reflectance of 90% or more.

A film 20 for absorbing light is formed at the periphery of the reflection electrodes 18 and the connection terminals 19. FIG. 3 shows the reflection electrodes 18 observed from above. The light-absorbing film 20 is like recess above the connection terminals 19 and the light is not reflected straightly there. Then, the film 20 may also formed on the connection terminals 19 in order to improve the display contrast.

The light-absorbing film 20 may be formed by deposition by sputtering or the like and subsequent patterning. After the reflection electrodes 18 are formed, a light-absorbing resin is applied to the whole surface thereof and between the reflection electrodes 18, and the light-absorbing resin is polished to remove the resin only on the reflection electrodes 18. It is not necessary to perform the patterning at a high precision. The effect of light absorption is sufficient even if there are some places not applied with the resin. The film 20 may be made of $PrMoO_3$ with sputtering or of phthalocyanine with plasma polymerization. The film 20 may be a material which is insulating electrically very well and does not affect the liquid crystal/resin composite layer badly. For example, black pigments or the like can be distributed in a resin, or fluoran pigments may be used. Further, a black mixture made by mixing green and red pigments may be used.

Though black materials are mentioned above, other color materials may be used for light valves for color image used for a projection display system. For example, for the light absorbing film 20 in a light valve for red, a light-absorbing material for a color filter may be developed to absorb a specified wavelength. For example, a natural resin is dyed with pigments or pigments are distributed in a resin. A appropriate pigments may be selected among azo dyes, anthraquinone dyes, phthalocyanine dyes, triphenyl methane resin and the like.

Many black pigments give bad influence to the liquid crystal/resin composite layer 15. Therefore, it is preferable that pigments which can absorb a specified wavelength be impregnated in the light-absorbing film 20. This approach is adopted easily for a projection display system where three display panels are used as light valves for red, green and blue. That is, pigments of a complement color of the color of the modulated light are impregnated in the light-absorbing film 20. For example, the complementary color of blue is yellow, and a yellow light-absorbing film is formed in the display panel for modulating blue.

Figure 4:
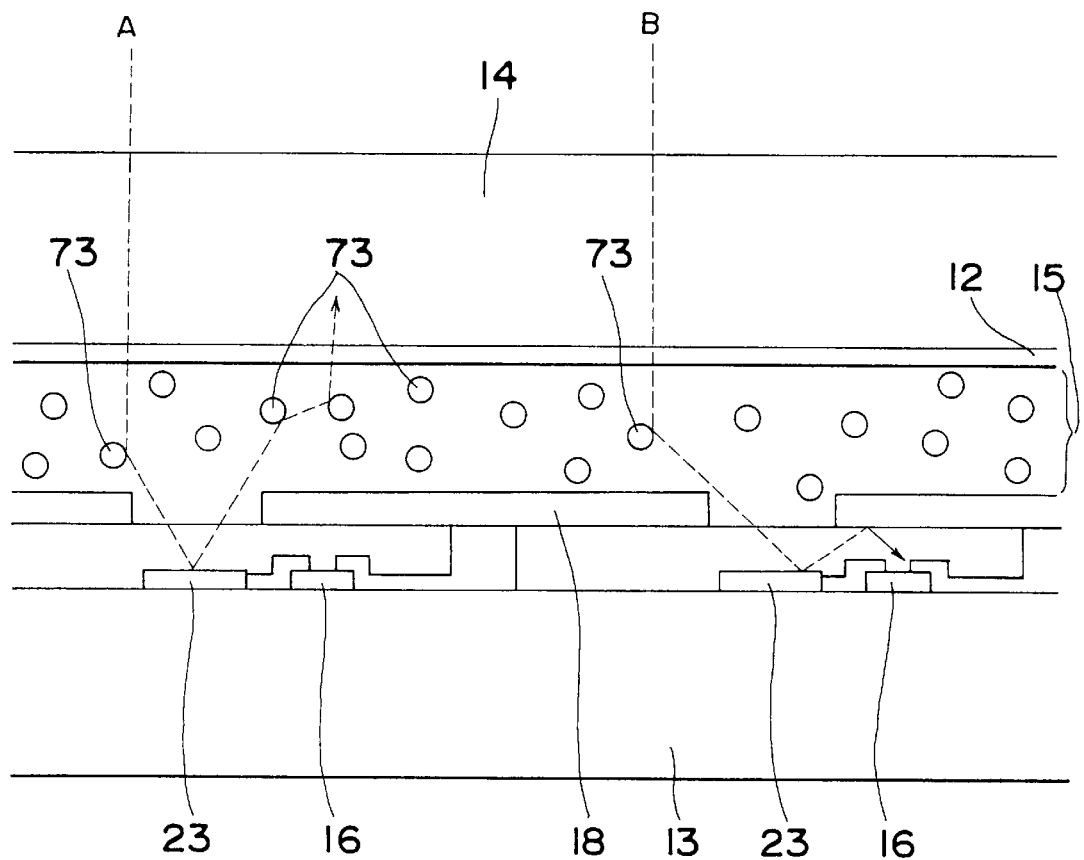
FIG. 4 is a schematic view of a prior art display panel.
Figure 5:
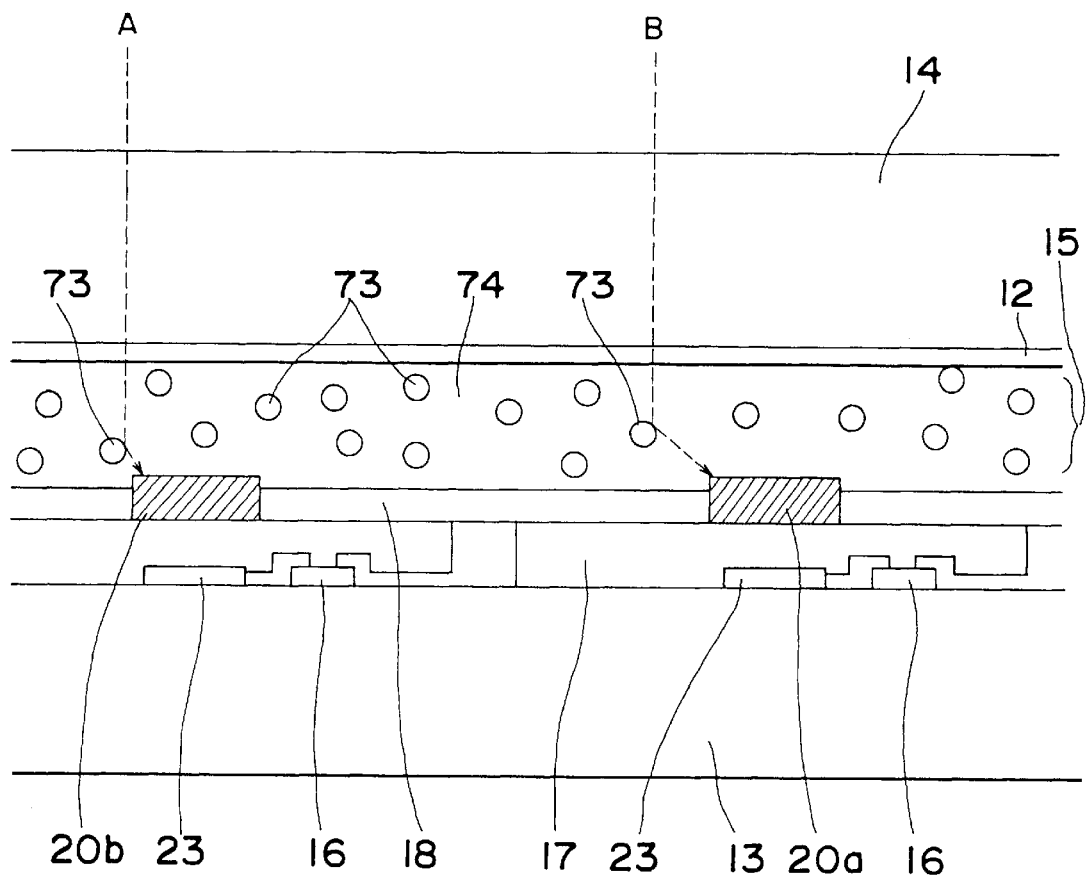
FIG. 5 is a schematic view illustrating the display panel of the present embodiment.

The light-absorbing film 20 has two main advantages. One advantage is the improvement of contrast. FIG. 4 shows a case without a light-absorbing film 20 for comparison. As shown in FIG. 4 by a dashed line, the incident light changes the propagation direction due to the scatterings at the droplet liquid crystal 73 in the liquid crystal layer 15. A part of the light is reflected by the source signal lines 23 and returns again in the liquid crystal/resin composite layer 15. Then, the light is scattered again by the droplets 73 and goes out through the counterelectrode substrate 14. Then, the light within a specified range are collected by a projection lens and is projected on a screen. Therefore, the display contrast becomes worse because the brightness of the black level becomes high. It is desirable that the incident light "A" does not go through the counterelectrode substrate 14 when the liquid crystal/resin composite is in the scattering state. On the contrary, FIG. 5 shows a case where the light-absorbing film 20 is formed. The light which enters the light-absorbing film 20b is absorbed or not reflected therefrom. This enhances the display contrast.

A second advantage is the prevention of photoconductor phenomenon of thin film transistors 16 in which the thin film transistors 16 are turned on when they are irradiated by light. If the thin film transistors 16 are not turned off, charges are not held between the reflection electrodes 18 and the counterelectrode 12 and the liquid crystal/resin composite layer 15 does not become the transmission state or white cannot be displayed. An incident light "B" shown in FIG. 4 is reflected between the source signal lines 23 and the reflection electrodes 18 and reaches the thin film transistors 16. On the contrary, as shown in FIG. 5, the light absorbing film 20a absorbs the light or shaded and the photoconductor phenomenon does not happen.

The light-absorbing films are also advantageous for other liquid crystal displays which form an optical image by using the change of optical scattering in the liquid crystal layer. For example, the light-absorbing films can be provided in liquid crystal layers such as thermal addressing mode, dynamic scattering mode or ferroelectric liquid crystal.

Figure 6:
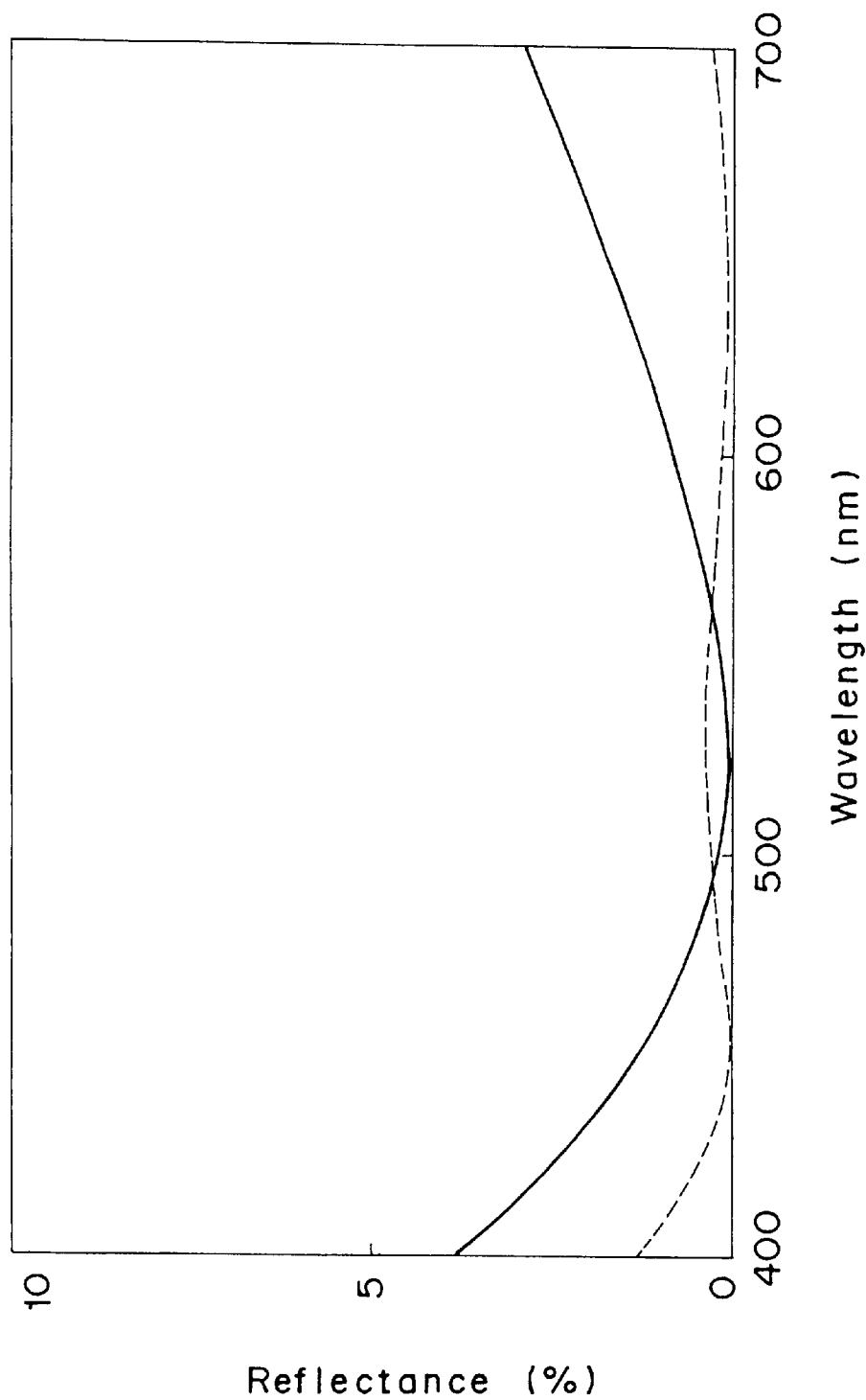
FIG. 6 is a graph of a reflectance of a display panel of the present invention.

An anti-reflection layer 11 shown in FIG. 2(a) of two-layer structure is applied to the counterelectrode substrate 14 at the side in contact with air in order to prevent reflection at the interface. The anti-reflection layer 11 is a V-coat type which is preferable for preventing the reflection over a narrow wavelength range and it consists of a $Y_2O_3$ layer 11a having an optical thickness of about $\lambda/4$ and a $MgF_2$ layer 11b having an optical thickness of about $\lambda/4$. SiO may be used instead of $Y_2O_3$, but it is preferable to use the latter because the former has an absorption band of blue. A solid line shown in FIG. 6 denotes the spectral reflectance of the anti-reflection layer 11 of V coat.

As explained above, the counterelectrode 12 is formed on the counterelectrode substrate 14. The counterelectrode 12 has a three layer structure and acts also as an anti-reflection layer.

A black matrix is not formed on the anti-reflection counterelectrode 12. If a black matrix is formed, a mixture solution of liquid crystal and resin injected between the array substrate 13 and the counterelectrode substrate 14 remains not polymerized below the black matrix when ultra-violet rays irradiate to separate the liquid crystal and the resin. This makes the optical modulation layer 15 unstable and deteriorates the performance of the display. Further, a black matrix lowers the aperture ratio. Still further, in a display panel of reflection type as shown in FIG. 2(a), the incident light is reflected by the black matrix, and this results in a display of the pattern of the black matrix on a screen in a projection display system.

In a modified example of a display panel shown in FIG. 2(b), the structure of the panel is the same as that shown in FIG. 2(a) except the structure of the anti-reflection counterelectrode explained below. That is, a two-layer anti-reflection counterelectrode 25 is formed instead of the three-layer anti-reflection counterelectrode 12 shown in FIG. 2 (a), and a three-layer anti-reflection film 24 is formed instead of the two-layer anti-reflection film 11 shown in FIG. 2(a).

In a prior art light valve of reflection type, the contrast is decreased by the reflection at interfaces between air and a counterelectrode substrate, between the counterelectrode substrate and a counterelectrode and between the counterelectrode and the liquid crystal layer. The reflectance R (%) at an interface of two materials of refractive indices of $n_A$ and of $n_B$ is expressed as follows:

$$R = \left( \frac{n_A - n_B}{n_A + n_B} \right)^2 \times 100 \tag{1}$$

If the counterelectrode substrate is made of glass, the refractive index of glass is usually 1.52 and that of air is 1.0 and the reflectance R at an interface between air and the substrate becomes about 4%.

Further, if a film of thickness "d" and of refractive index of $n_C$ is formed between two materials of refractive indices of $n_A$ and $n_B$, the reflectance R (%) at wavelength $\lambda$ is expressed as follows:

$$B(\theta_2) = \frac{r_1^2 + r_2^2 + 2r_1 r_2 \cos \epsilon}{1 + r_1^2 r_2^2 + 2r_1 r_2 \cos \epsilon} \times 100 \tag{2}$$

wherein $$r_1 = \frac{n_C - n_A}{n_C + n_A},$$

$$r_2 = \frac{n_B - n_C}{n_B + n_C}$$

and $$\epsilon = \frac{4\pi n_C d}{\lambda}.$$

The refractive index of a counterelectrode is 2.0 if an indium tin oxide thin film is used as the counterelectrode, that of glass substrate is 1.52 and that of a liquid crystal layer is for example 1.6. Then, the reflectance R (%) becomes about 6% at most at a specified wavelength though it depends on the film thickness. Therefore, if a reflection type display is used, light of at most about 10% is reflected without entering the liquid crystal layer 15 and this deteriorates the contrast.

In order to prevent reflection effectively, the optical thickness of dielectric thin films formed on one or two surfaces of a counterelectrode or indium tin oxide film becomes important. In a prior art twisted-nematic liquid crystal, an alignment film is needed, but the alignment film cannot be formed with a precision of about 1 μm. Then, an alignment film deteriorates or eliminates the anti-reflection at the interface. On the contrary, a liquid crystal/resin composite needs no alignment film. Therefore, a good anti-refection film can be prepared as a multi-layer film.

In order to decrease the reflection at the two surfaces of a counterelectrode, a multi-layer film made of at least two layers is formed which satisfies specified conditions explained below. In a two-layer film 25 as shown in FIG. 2(b), the conditions for the smallest reflectance are as follows:

$$n_1^2 = n_G n_{LC},\quad(3)$$

and $$n_1 d_1 = n_2 d_2/2 = \lambda/4,\quad(4)$$

or $$(n_2/n_1)^2 = n_{LC}/n_G,\quad(5)$$

and $$n_1 d_1 = n_2 d_2 = \lambda/4,\quad(6)$$

where $n_G$ denotes the refractive index of the glass substrate 14, $n_{LC}$ denotes that of the liquid crystal layer 15, $n_1$ denotes that of a dielectric film 25a formed between the glass substrate 14 and the indium tin oxide film 25b, $n_2$ denotes that of the indium tin oxide film 25b, $d_1$ denotes a thickness of the dielectric film 25a, $d_2$ denotes that of the indium tin oxide film 25b, and λ denotes the wavelength of light transmitting the liquid crystal layer 15. It is to be noted that thicknesses $d_1$ and $d_2$ represent physical thicknesses while $n_1 d_1$ and $n_2 d_2$ represent optical thicknesses.

The above-mentioned conditions are applied to light of wavelength of λ. If the reflection is intended to be decreased in a wide wavelength range, Eqs. (3) and (4) are more appropriate than Eqs. (5) and (6). Further, the-indium tin oxide film 15b preferably has a physical thickness of 100 nm or more in order to decrease the resistance sufficiently. This also makes Eqs. (3) and (4) better.

Figure 2B:
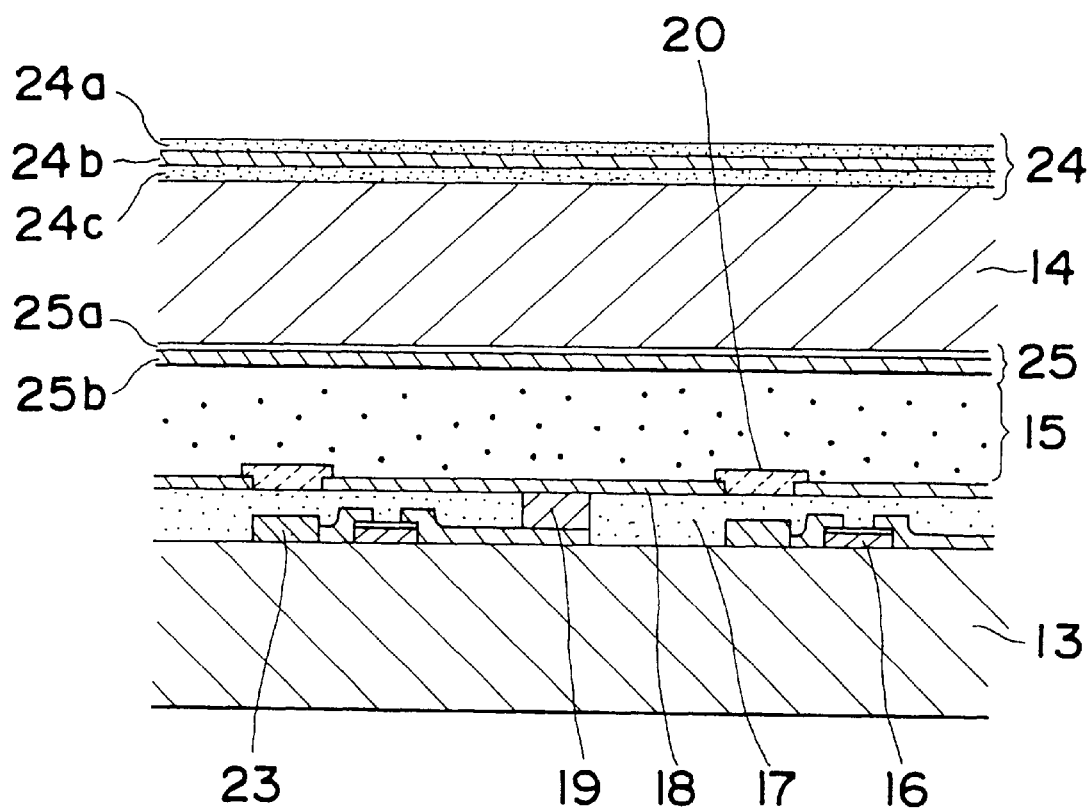

The anti-reflection film 25 shown in FIG. 2(b) is constructed according to the above-mentioned conditions. The film 25 is a two-layer film consisting of a counterelectrode 25b made having an indium tin oxide of optical thickness of λ/2 and a dielectric thin film 25a having an optical thickness of λ/4 and having a refractive index smaller than that of the counterelectrode 25b. Further, the refractive index of the dielectric film 25a is larger than that of the liquid crystal layer 15 under no electric field. That is, the refractive index $n_1$ of the dielectric film 25a and that $n_2$ of the indium tin oxide (ITO) film 25b satisfy a relation $n_2 > n_1 > n_x$ wherein $n_x$ denotes the refractive index of the liquid crystal layer 15 when an electric field is not applied. This condition is also needed for the anti-reflection film 12 shown in FIG. 2(a).

Figure 7:
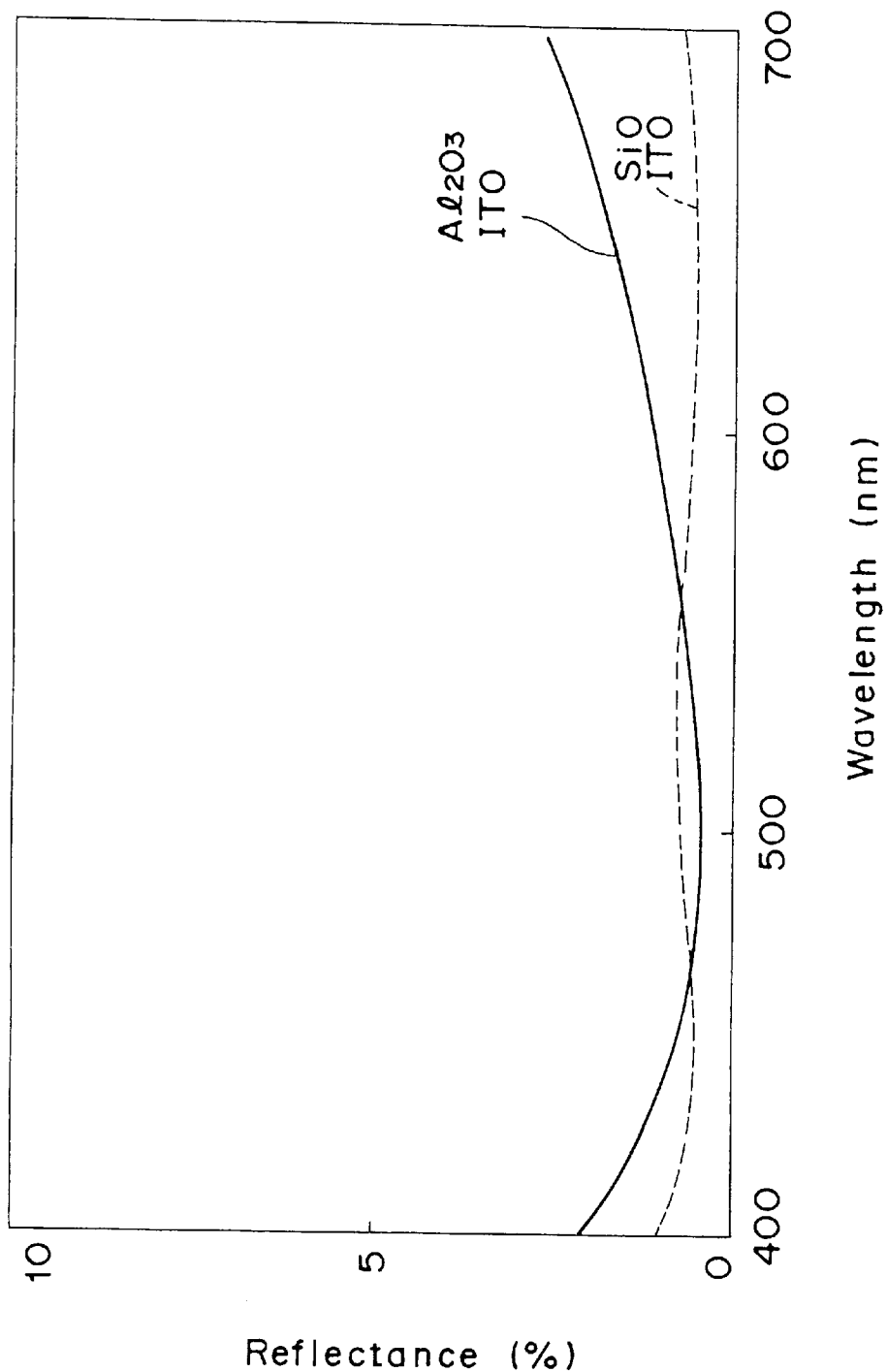
FIG. 7 is a graph of a reflectance of a display panel of the present invention.

Table 1 shows an example of the construction of the multi-layer film, and FIG. 7 shows the spectral reflectance of the film. It is clear that the reflectance of 0.3% or less is realized over a wavelength band of 100 nm or more, and this decreases the reflected light largely.

TABLE 1

| | Anti-reflection structure | | |
|---|---|---|---|
| Material | Refractive index | Optical thickness of thin film (nm) | Physical thickness of thin film (nm) |
| Glass substrate | 1.52 | — | — |
| $Al_2O_3$ | 1.62 | 130.0 | 80.2 |
| ITO | 2.00 | 260.0 | 130.0 |
| Liquid crystal | 1.60 | — | — |

NB: main wavelength λ = 520 nm.

The refractive index $n_x$ of the liquid crystal/resin composite layer 15 is expressed theoretically as follows when an electric field is not applied:

$$n_x = (n_e + 2 \times n_o)/3,\quad(7)$$

wherein $n_o$ denotes the ordinary refractive index of liquid crystal and $n_e$ denotes the extraordinary refractive index thereof. In case of a cyanobiphenyl liquid crystal, $n_o$ is about 1.50 and $n_e$ is about 1.75. The scattering characteristic is improved more with increase in the difference Δn of the refractive indices. In case of a fluoride liquid crystal, both $n_e$ and Δn are relatively small, and the scattering characteristic is not very good. However, it has a high heat resistance and light resistance, and the dielectric constant thereof is relatively small. Therefore, a higher electric voltage can be applied to a fluoride liquid crystal than to a cyanobiphenyl liquid crystal. Therefore, though the scattering characteristic is low per film thickness, a good scattering characteristic can be obtained by increasing the thickness.

If $n_o$ and $n_e$ of the cyanobiphenyl liquid crystal are substituted in Eq. (7), $n_x$ becomes about 1.6. The optical modulation layer 15 consists of liquid crystal and polymer (resin), and the refractive index $n_p$ of the polymer is usually selected to agree roughly with $n_o$. Therefore, the refractive index $n_x$ of the liquid crystal/resin composite layer 15 under no electric field becomes less than 1.6.

In the embodiments in this specification, the refractive index of a liquid crystal is taken as 1.6 which is the highest to be realized actually, and it may be smaller in actual cases. The spectral reflectance becomes the smallest if the refractive index of the glass substrate agrees with that of the liquid crystal layer 15. The refractive index of a liquid crystal layer 15 will not be much larger than 1.6 and smaller than 1.6 actually, and it agrees roughly with that of the glass substrate.

It is desirable that the refractive index of the dielectric thin film 25a is between 1.5 and 1.7, more preferably between 1.6 and 1.7. In the example shown in Table 1, $Al_2O_3$ is used, the thin film 25b may also be made of $CeF_3$, SiO, $WO_3$, $LaF_3$ or $NdF_3$.

Table 2 shows an example wherein SiO is used instead of $Al_2O_3$. Further, FIG. 7 shows the spectral reflectance of this case as a dashed line.

TABLE 2

Anti-reflection structure

| Material | Refractive index | Optical thickness of thin film (nm) | Physical thickness of thin film (nm) |
| --- | --- | --- | --- |
| Glass substrate | 1.52 | — | — |
| SiO | 1.70 | 130.0 | 76.5 |
| ITO | 2.00 | 260.0 | 130.0 |
| Liquid crystal | 1.60 | — | — |

NB: main wavelength $\lambda$ = 520 nm.

It is found that the reflectance of 1% or less can be realized over a wavelength band between 400 and 700 nm by using sio. In a projection display system which will be explained later uses three display panels for modulating red, green and blue as light valves. In the spectral reflectance shown as a solid line ($Al_2O_3$) in FIG. 7, the reflectance for green is very small while the reflectances for blue and for red are large. Then, an anti-reflection electrode 25 has to be provided for red, green and blue. On the contrary, the spectral reflectance shown as a dashed line is 1% or less for red, green and blue, so that one kind of display panel may be used for the three light valves.

It is to be noted that an anti-reflection film comprises an indium tin oxide film as a counterelectrode. It is natural that the indium tin oxide film is formed so that an electric voltage can be applied. The indium tim oxide film may be replaced by a film of indium oxide, tin oxide or the like. In such a case, it is preferable that one or more dielectric thin films may be layered for decreasing the reflection.

If a three-layer film 12 of an indium tin oxide layer 12b as a counterelectrode and two dielectric layers 12a, 12c at the two sides is constructed as shown in FIG. 2(a), the reflectance can be decreased further than a two-layer film 25 as shown in FIG. 2(b). In this case, the conditions on the refractive indices and thicknesses are as follows:

$$(n_3/n_1)^2 = n_{LC}/n_G, \qquad (8)$$

and $$n_1 d_1 = n_2 d_2/2 = n_3 d_3 = \lambda/4, \qquad (9)$$

or $$(n_1 d_3)^2 = n_2 n_G n_{LC}, \qquad (10)$$

and $$n_1 d_1 = n_2 d_2 = n_3 d_3 = \lambda/4, \qquad (11)$$

where $n_G$ denotes the refractive index of the glass substrate 14, $n_{LC}$ denotes that of the liquid crystal layer 15, $n_1$ denotes that of a dielectric film 12a formed between the glass substrate 14 and the indium tin oxide film 12b, $n_2$ denotes that of the indium tin oxide film 12b, $n_3$ denotes that of the dielectric thin film 12c interposed between the indium tin oxide 12b and the liquid crystal layer 15, $d_1$ denotes a thickness of the dielectric thin film 12a, $d_2$ denotes that of the indium tin oxide film 12b, $d_3$ denotes that of the dielectric thin film 12c, and $\lambda$ denotes the wavelength of light transmitting the liquid crystal layer 15. It is to be noted that thicknesses $d_1$, $d_2$ and $d_3$ represent physical thicknesses while $n_1 d_1$, $n_2 d_2$ and $n_3 d_3$ represent optical thicknesses.

The above-mentioned non-reflection conditions are applied to light of wavelength of $\lambda$. If the reflection is intended to be decreased in a wide wavelength range, Eqs. (8) and (9) are more appropriate than Eqs. (10) and (11). Further, the indium tin oxide film 12b preferably has a physical thickness of 100 nm or more in order to decrease the resistance sufficiently. This also makes Eqs. (8) and (9) better.

The anti-reflection film 12 shown in FIG. 2(a) is constructed according to the above-mentioned conditions. The film 12 is a three-layer film consisting of a counterelectrode 12b made of indium tin oxide having an optical thickness of $\lambda/2$ and two dielectric thin film 12a and 12c having an optical thickness of $\lambda/4$ and having a refractive index smaller than that of the counterelectrode 12b. Further, the refractive index of the dielectric film 12a is larger than that of the liquid crystal layer 15 under no electric field. That is, the refractive index n, of the dielectric films 25a and 25c and $n_2$ of the indium tin oxide (ITO) film 25b satisfy the relationship $n_2 > n_1 > n_x$ wherein $n_x$ denotes the refractive index of the liquid crystal layer 15 when an electric field is not applied.

Figure 8:
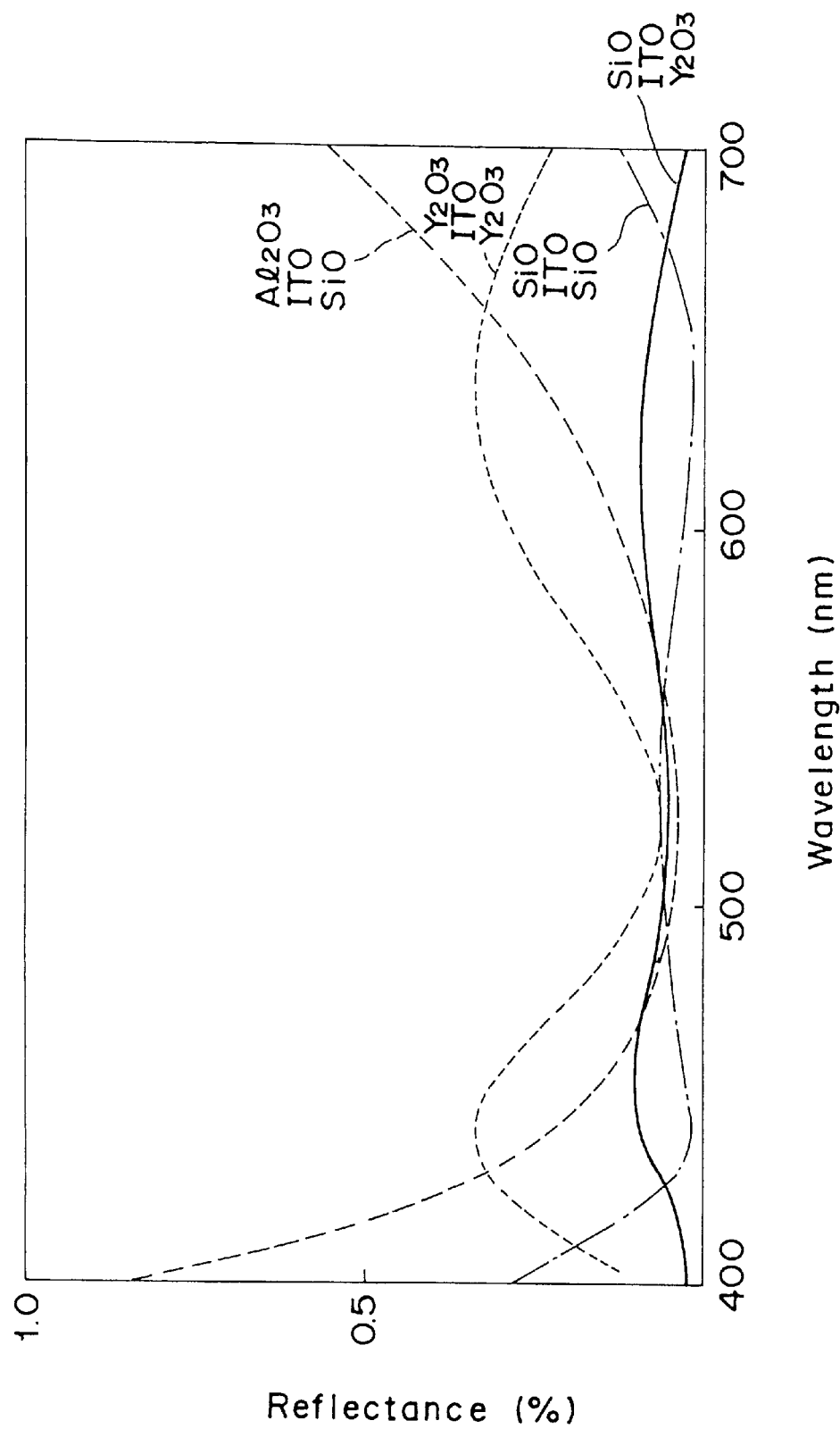
FIG. 8 is a graph of a reflectance of a display panel of the present invention.

Table 3 shows an example wherein SiO is used for the dielectric thin films 12a and 12c, and FIG. 8 shows the spectral reflectance of this case as a dash and dot line. In FIG. 8, the top, middle and bottom names of materials denote the materials for layers 12a, 12b and 12c successively. It is found that the reflectance of 0.1% or less can be realized over a wavelength band of 200 nm or the reflection can be prevented very well.

TABLE 3

Anti-reflection structure

| Material | Refractive index | Optical thickness of thin film (nm) | Physical thickness of thin film (nm) |
| --- | --- | --- | --- |
| Glass substrate | 1.52 | — | — |
| SiO | 1.70 | 130.0 | 76.5 |
| ITO | 2.00 | 260.0 | 130.0 |
| SiO | 1.70 | 130.0 | 76.5 |
| Liquid crystal | 1.60 | — | — |

NB: main wavelength $\lambda$ = 520 nm.

It is desirable that the refractive index of the thin film 12b be between 1.60 and 1.80. In the example shown in Table 3, SiO is used, but at least one of the dielectric thin films 12a and 12c may also be made of $Al_2O_3$, $Y_2O_3$, MgO, $CeF_3$, $WO_3$ or $PbF_2$.

Table 4 shows an example wherein $Y_2O_3$ is used for the dielectric films 12a and 12c. Further, FIG. 8 shows the spectral reflectance of this case as a dashed line. As to $Y_2O_3$, the refractive index of 1.78 to 1.88 can be prepared according to deposition conditions.

TABLE 4

Anti-reflection structure

| Material | Refractive index | Optical thickness of thin film (nm) | Physical thickness of thin film (nm) |
| --- | --- | --- | --- |
| Glass substrate | 1.52 | — | — |
| $Y_2O_3$ | 1.78 | 130.0 | 73.0 |
| ITO | 2.00 | 260.0 | 130.0 |
| $Y_2O_3$ | 1.78 | 130.0 | 73.0 |
| Liquid crystal | 1.60 | — | — |

NB: main wavelength $\lambda = 520$ nm.

The reflectance of this case is a little higher for blue and red if compared with the case when $Al_2O_3$ is used for the dielectric thin films 12a and 12c.

Similarly, Table 5 shows an example wherein $Y_2O_3$ is used for the dielectric film 12a and SiO is used for the other film 12c. Further, FIG. 8 shows the spectral reflectance of this case as a solid line. It is found that the reflectance is 0.1% or less over a wavelength range of visible light or a very good anti-reflection can be realized.

TABLE 5

Anti-reflection structure

| Material | Refractive index | Optical thickness of thin film (nm) | Physical thickness of thin film (nm) |
| --- | --- | --- | --- |
| Glass substrate | 1.52 | — | — |
| SiO | 1.70 | 130.0 | 76.5 |
| ITO | 2.00 | 260.0 | 130.0 |
| $Y_2O_3$ | 1.78 | 130.0 | 73.0 |
| Liquid crystal | 1.60 | — | — |

NB: main wavelength $\lambda = 520$ nm.

Further, Table 6 shows an example wherein $Al_2O_3$ is used for the dielectric film 12a and SiO is used for the other film 12c, and FIG. 8 shows the spectral reflectance of this case as a dashed line. It is found that the reflectance is 0.5% or more over a wavelength range of blue and red or the multi-layer film is not good for anti-reflection.

TABLE 6

Anti-reflection structure

| Material | Refractive index | Optical thickness of thin film (nm) | Physical thickness of thin film (nm) |
| --- | --- | --- | --- |
| Glass substrate | 1.52 | — | — |
| $Al_2O_3$ | 1.62 | 130.0 | 80.3 |
| ITO | 2.00 | 260.0 | 130.0 |
| SiO | 1.70 | 130.0 | 76.5 |
| Liquid crystal | 1.60 | — | — |

NB: main wavelength $\lambda = 520$ nm.

As explained above, a three-layer film can prevent reflection. In general, a three-layer structure as shown in FIG. 2(a) can prevent reflection better for visible light than a two-layer structure as shown in FIG. 2(b).

If an indium tin oxide film makes contact directly with the liquid crystal layer 15, the latter is liable to deteriorate, and this is ascribed to impurities in the indium tin oxide film which is solved into the liquid crystal/resin composite layer 15. If an indium tin oxide film is isolated from the liquid crystal layer 15 via a dielectric film as in the three-layer structure 12, the liquid crystal/resin composite is prevented to be deteriorated. This effect is observed well if the dielectric film is made of $Al_2O_3$ or $Y_2O_3$.

If the dielectric film is made of SiO, there is a tendency that the refractive index decreases. This is ascribable to that a very small amount of oxygen included in $H_2O$ or $O_2$ combines with SiO to form $SiO_2$. In this sense, the structures shown in Tables 3 and 6 are not good. However, SiO does not change to $SiO_2$ in a short time and SiO can be used practically in many cases. The two-layer and three-layer structures explained above can be applied to an electrode 107 shown in FIG. 9.

Figure 9:
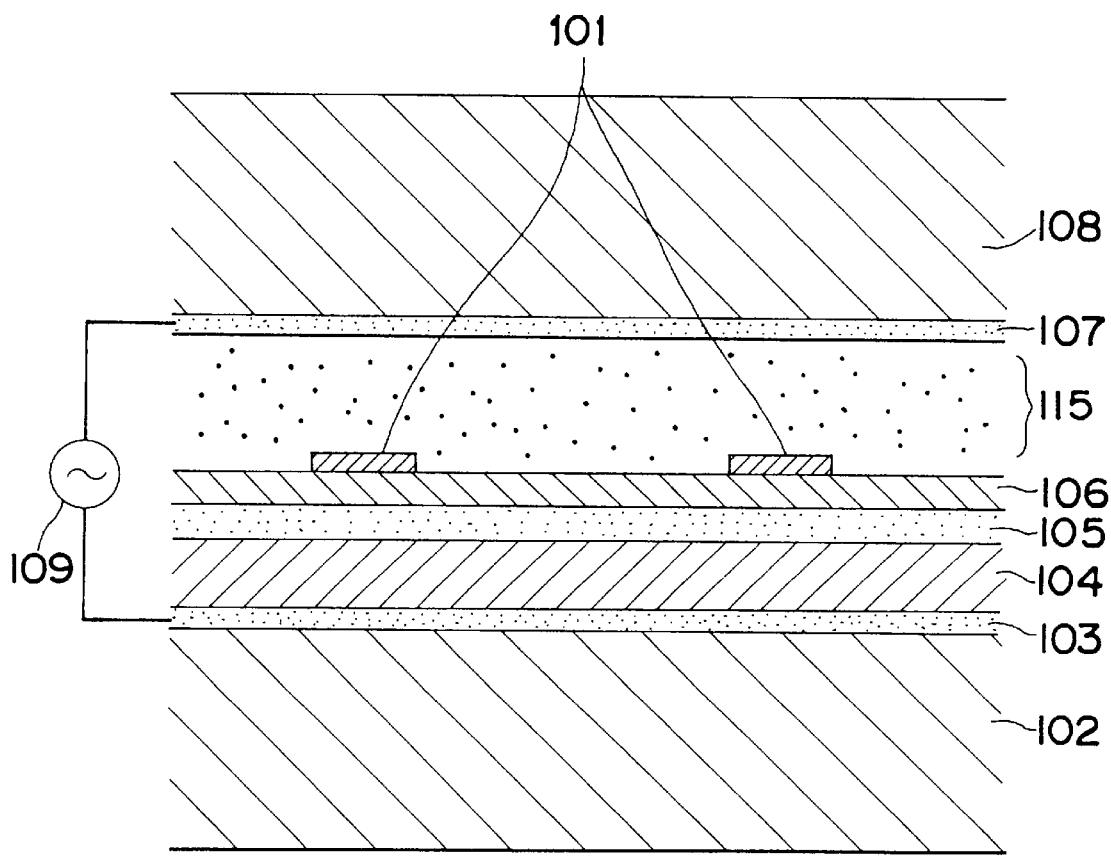
FIG. 9 is a schematic sectional view of a part of a further embodiment of a display panel of the present invention.

Reflection type display panels shown in FIGS. 2(a) and 2(b) are explained above. However, the light-absorbing thin films and the anti-reflection electrodes can be used also for an optically addressed display panel as shown in FIG. 9. In the display panel, an electrically conducting film 103, a photoconducting layer 104 made of amorphous silicon, a shading film 105 and a dielectric mirror 106 are layered successively on a glass substrate 102. Light-absorbing films 101 are formed on the dielectric mirror 106. On the other hand, an anti-reflection electrode 107 is formed on a counterelectrode substrate 108. A liquid crystal/resin composite layer 115 is filled between the two substrates 102 and 108. An AC voltage is applied between the electrically conducting film 103 and the anti-reflection electrode 107 with a power source 109, and the electric field in the liquid crystal/resin composite layer 115 changes according to the optical excitation in the photoconducting layer 104.

The anti-reflection electrode 107 has a similar structure to the anti-reflection counterelectrodes 12 and 25 shown in FIGS. 2(a) and 2(b), and the light-absorbing films 101 are similar to the films 20 shown in FIGS. 2(a) and 2(b). The functions thereof are the same as those of the counter-parts in the reflection-type display panels shown in FIGS. 2(a) and 2(b).

Figure 10:
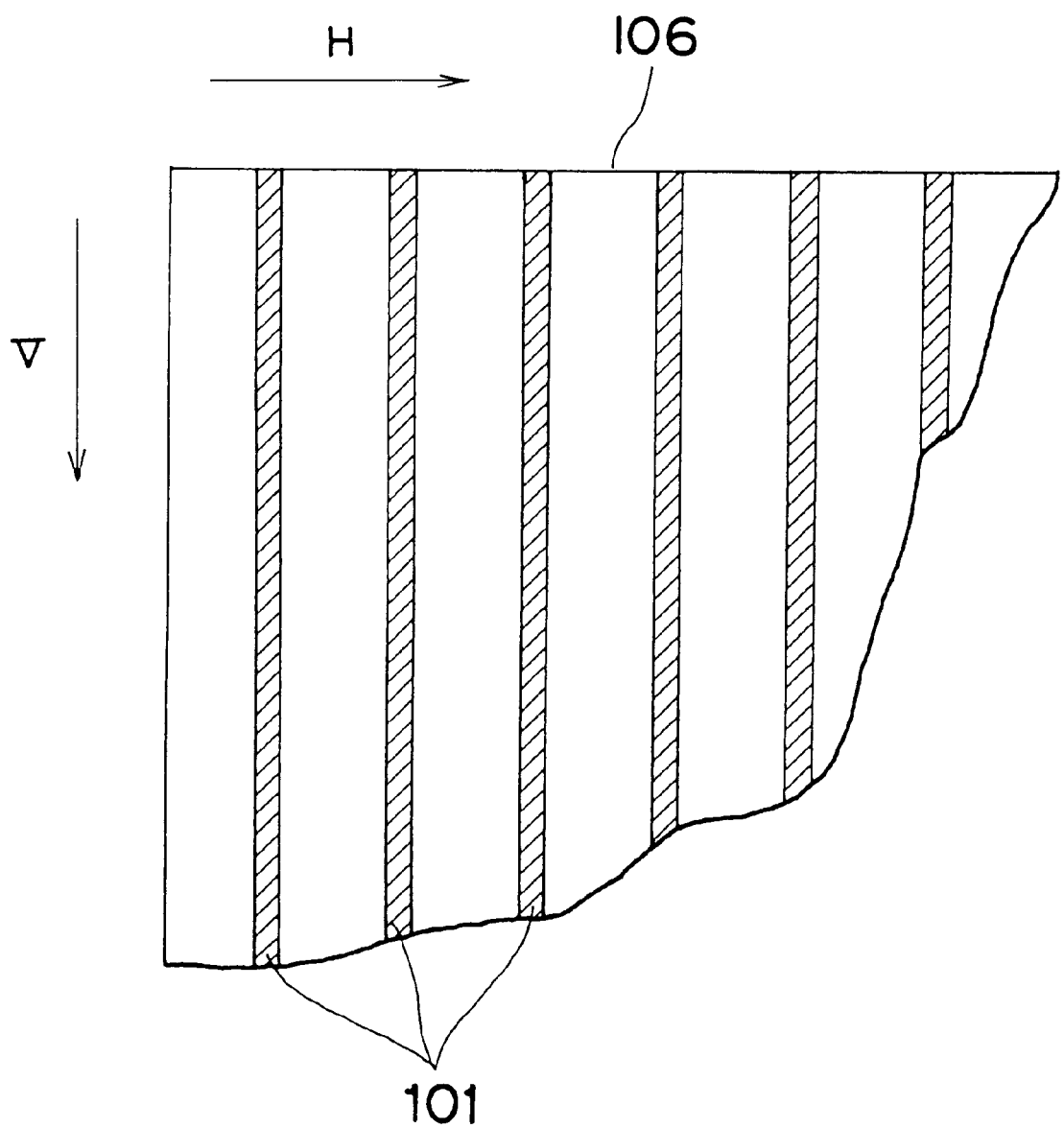
FIG. 10 is a schematic partial plan view of a display panel.

The light-absorbing films 101 have a stripe-like structure as shown in FIG. 10 wherein the "H" direction denotes a horizontal direction of an image and the "V" direction denotes a vertical direction of the image. By forming the light-absorbing electrodes 101 as a stripe-like structure, the leakage of light in the horizontal direction can be prevented. It is preferable that the pitch of the light-absorbing electrodes 101 corresponds to the width of a pixel. If the light-absorbing films has a matrix-like structure, the leakage of light can be prevented more effectively. However, because the light-absorbing films do not reflect light, it is not appropriate for a multi-scan display which is a characteristic of an optically addressed display panel. If a stripe-like structure as shown in FIG. 10 is adopted, it is possible to change the image size in the "V" direction though it is difficult to change it in the "H" direction.

Figure 11:
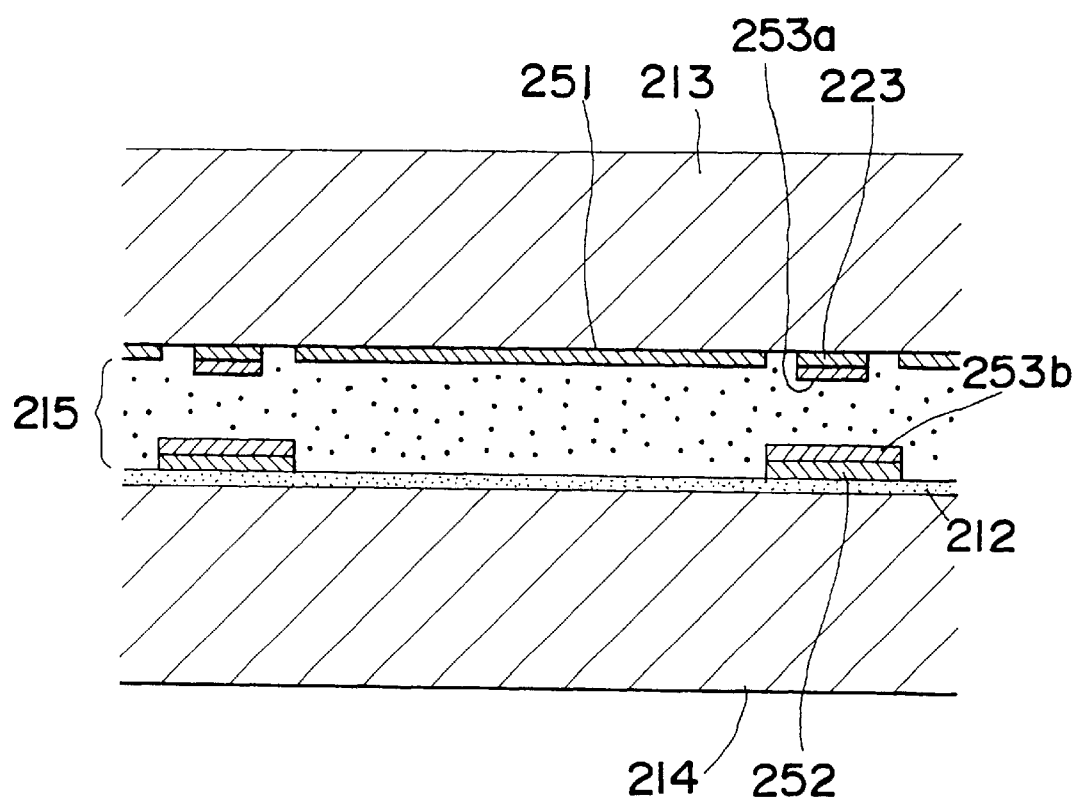
FIG. 11 is a schematic sectional view of a display panel of another embodiment of the present invention.

FIG. 11 shows another transmission-type display panel. A counterelectrode 212 is formed on a counterelectrode substrate 214, but it is not necessary to adopt an anti-reflection electrode as used in FIG. 2(a). A black matrix 252 made of chromium usually is formed on the counterelectrode 212. Pixel electrodes 251 of indium tin oxide, source signal lines 223 and the like are formed on an array substrate 213. Light-absorbing films 253a and 253b are formed on the black matrix 252 and on the signal lines such as the source signal lines 223. A liquid crystal/resin composite layer 215 is filled between the two substrates 213 and 214. The function and the material of the light-absorbing films 253a and 253b are similar to those of the counterparts shown in FIG. 2(a). Preferably, the color of the light-absorbing films 253a and 253b is a complement color for the incident light in the liquid crystal/resin composite layer 215.

Figure 12:
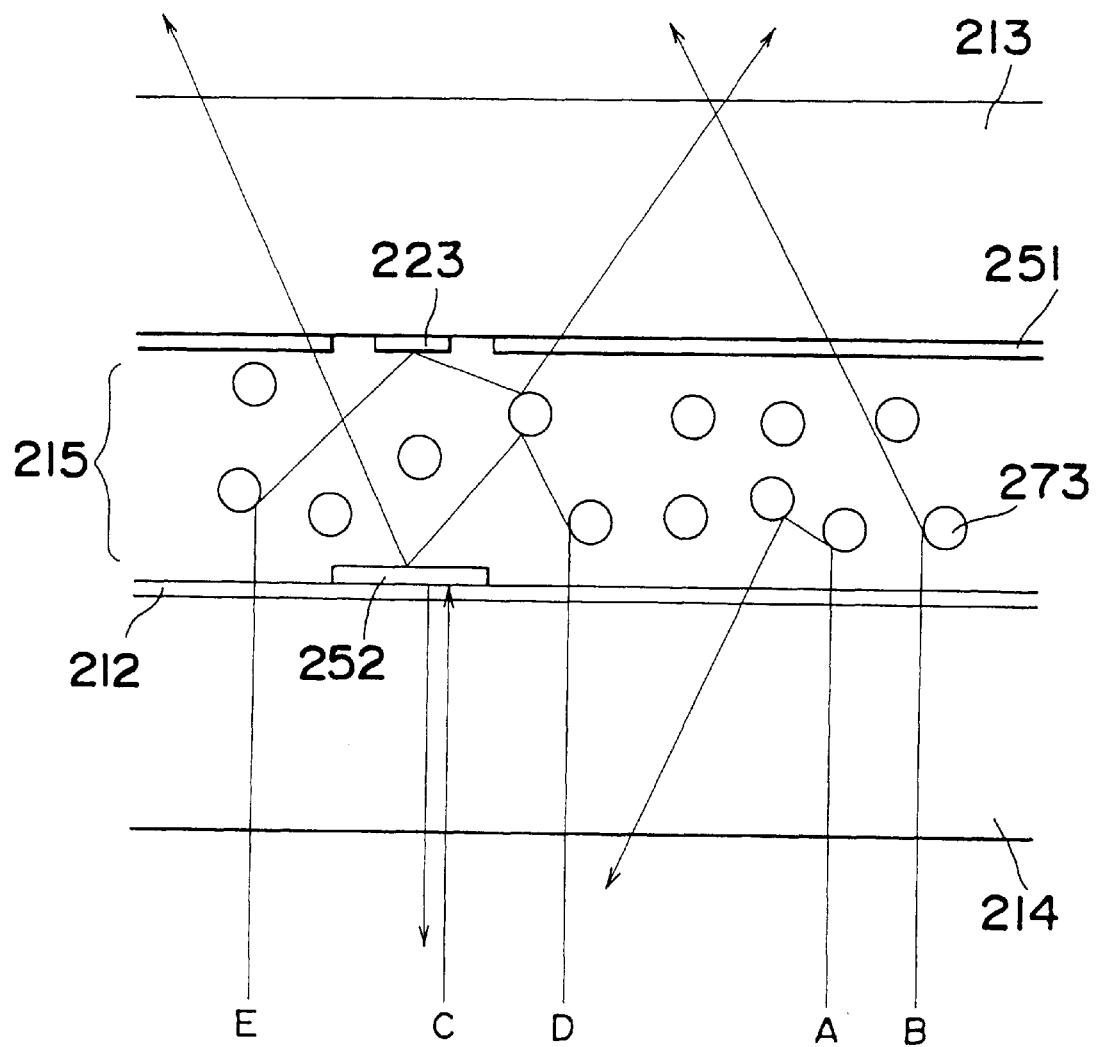
FIG. 12 is a schematic sectional view illustrating the display panel.

An advantage of the above-mentioned transmission type display panel is explained below with reference to FIG. 12 wherein light-absorbing films are not formed for comparison. A light ray "A" is scattered by the droplets of liquid crystal 273 and returns to the incident side. A light ray "B" is scattered by the droplets of liquid crystal 273 and leaks to the array substrate 213. A light ray "C" is reflected by the black matrix 252 and returns to the incident side. A light ray "D" is scattered by the black matrix 252 in the liquid crystal/resin composite layer 215 and leaks to the array substrate 213. A light ray "E" is reflected by the source signal lines 223 and leaks to the array substrate 213. That is, the light ray "B", "D" and "E" leak to the array substrate 213 in the scattering state of the liquid crystal/resin composite layer 215. Because the black matrix 252, and the signal lines 223 are made of metallic thin films, they have relatively high reflectance. Therefore, they enhance the leakage amount to the array substrate, and this lowers the display contrast.

Recently, the pixel size has decreased and the area occupied by the black matrix in a pixel has increased. For example, the area is about 70% for a panel of three inches square with 0.3 million pixels. It is predicted that the area will be over 90% with 1 million pixels. Therefore, the leakage of light due to the black matrix is a significant problem. Further, it is also a problem that the reflected light enters to adjacent pixels make the contour unclear and to decrease the contrast in the whole-display area. Similarly, the light reflected by the source signal lines, the gate signal lines, the thin film transistors and the like cannot be neglected.

Figure 13:
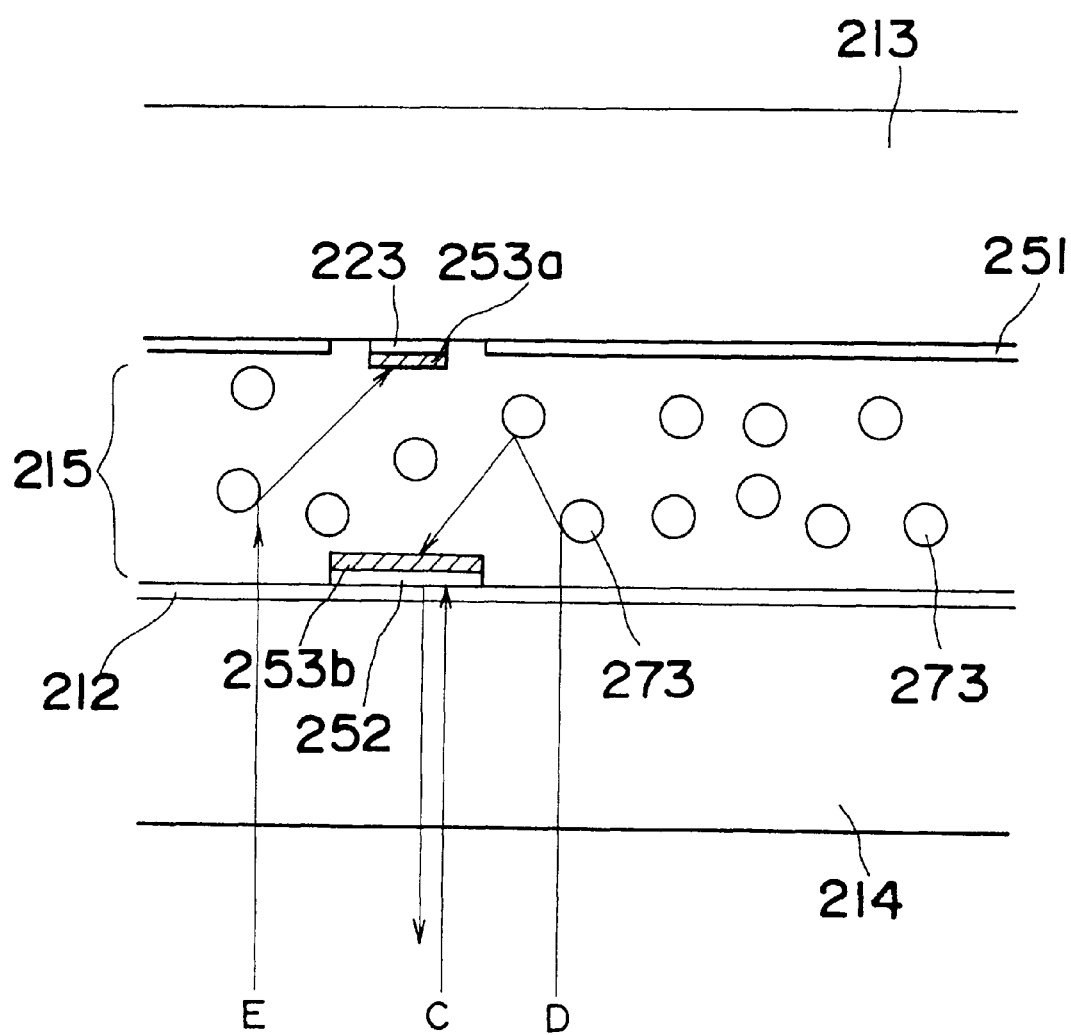
FIG. 13 is a schematic sectional view illustrating the display panel of the present invention.

As shown in FIG. 13, if light-absorbing films 253a and 253b are formed on the black matrix 252 and on the signal lines such as the source signal lines 223, the incident light ray "D" is scattered by the droplets of liquid crystal 273 and a part thereof is absorbed by the light-absorbing films 253b, while the incident light ray "E" is absorbed partly by the light-absorbing film 253a. Thus, the light leaked to the array substrate 213 can be decreased.

Figure 14:
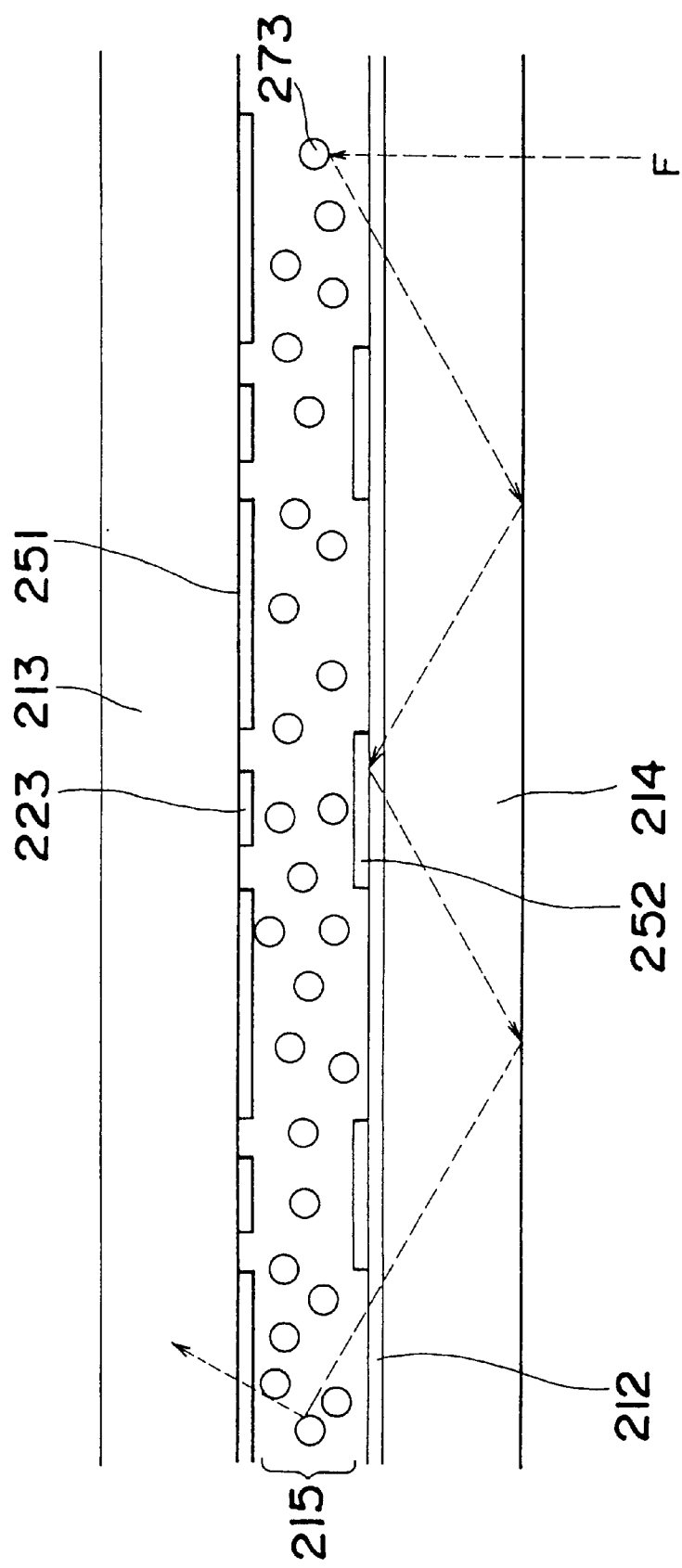
FIG. 14 is a schematic sectional view illustrating the display panel.

One of the problems of display panels using liquid crystal/resin composite is the decrease in display contrast due to the light reflected at the interfaces of the array substrates 213 and of the counterelectrode substrate 214 with air. For example, as shown in FIG. 14, an incident light ray "F" is scattered by the droplets of liquid crystal 273 and a part thereof is reflected at the interface of the substrate 214 with air and with the black matrix 252 and enters again into the liquid crystal/resin composite layer 215.

Figure 15:
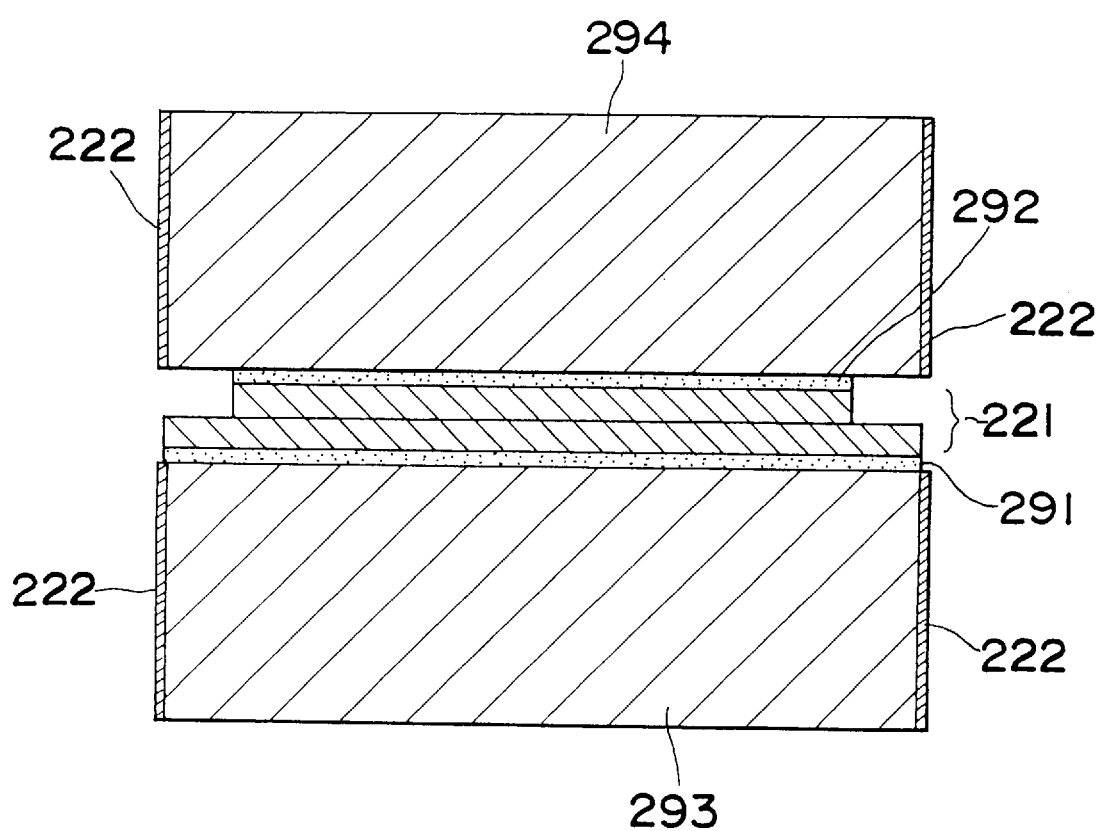
FIG. 15 is a schematic sectional view of a display panel of an embodiment of the present invention.
Figure 16:
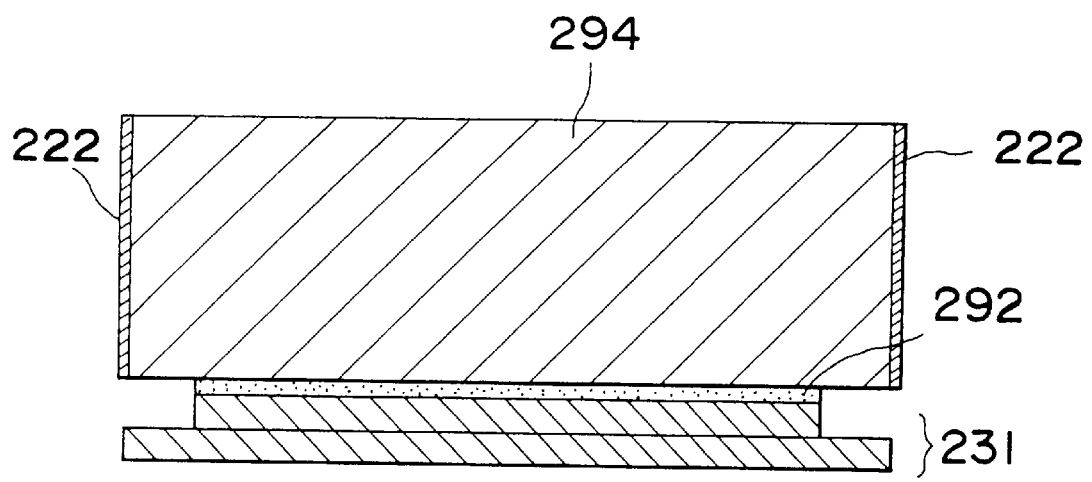
FIG. 16 is a schematic sectional view of a display panel of a different embodiment of the present invention.

In order to prevent such an incident light, in the case of a transmission type display panel, as shown in FIG. 15, transparent plates 293 and 294 are connected to an array substrate 213 and a counterelectrode consisting of a substrate 214 of a display panel 221, optical coupling layers 291 and 292 such as a transparent silicone resin, an ultra-violet rays setting type adhesive, an epoxy transparent adhesive or an ethylene glycol of refractive index of about 1.4–1.5. It is preferable that the difference of the refractive index with those of the glass substrates of the display panel 221 or 223 is 0.05 or less. The transparent plates 293 and 294 are thick plates or in detail columnar or square glass plates having a diameter larger than the maximum diameter of the effective display area of the display panel 221, and they are also made of an acrylic resin, a polycarbonate resin or the like. These are relatively cheap and can be produced to have any shape. Further, the weight is light. In case of a reflection type display panel 231, as shown in FIG. 16, only a transparent plate 294 is adhered to the incident lightside. Further, a black paint 222 is applied to the ineffective area of the transparent substrates 293 and 294 so as to absorb the light reflected at the interface thereof with air.

The total thickness "t" of the transparent plate 294 and the counterelectrode substrate 214 or that of the transparent plate 293 and the array substrate 213 at the center is selected to satisfy the following relationship for the reasons stated in Japanese Patent application No. 4-145277/1990:

$$t \geq \frac{d}{4}\sqrt{n^2 - 1} \tag{12}$$

wherein "d" denotes the maximum size of the effective display area of display panel and "n" denotes the refractive index of the glass. If the thickness of only the counterelectrode substrate or of the array substrate satisfies the relationship (12), the transparent plates 293 and 294 are not needed.

By selecting the thickness "d" at the center as mentioned above or by making a part of the transparent substrates 293 and 294 concave, the light from the liquid crystal/resin composite layer 215 and reflected at the interface of the transparent plates 293 and 294 with air is absorbed by the light-absorbing paint 222 and is prevented from returning to the liquid crystal/resin composite layer 215 in the panels 221 and 231.

Figure 17:
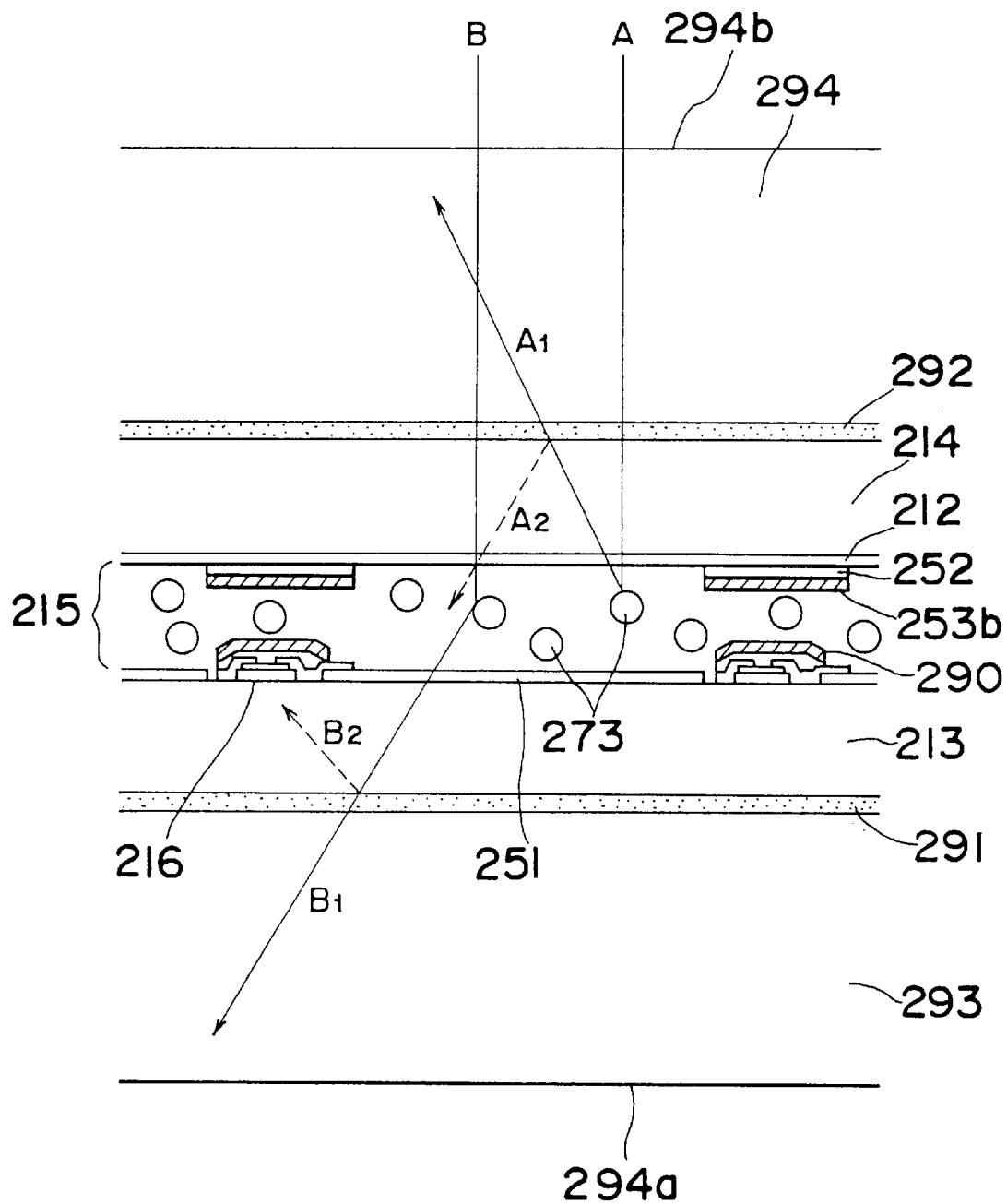
FIG. 17 is a schematic sectional view illustrating a display panel of another embodiment of the present invention.

Then, as shown in FIG. 17, the incident light is scattered by the droplets of liquid crystal 273 and the scattered light ray "A1" is reflected at the incident plane 294b of the transparent plate and absorbed by the black paint 222. If the transparent plate 294 is not provided, a part "A2" of the light ray "A1" is reflected at the interface of the substrate 214 with air and enters again into the liquid crystal layer 215. The transparent plates 293 and 294 increase the brightness of the liquid crystal/resin composite layer 215 under no electric field and this decreases the display contrast.

One of the problems to decrease the display contrast is the leakage at the thin film transistors 216 due to the photoconductor phenomenon as mentioned above. Even if shading films 290 are formed on the thin film transistors 216 in the transmission type display panel, the incident light ray "B" may return as the light ray "B2" after the scattering at the liquid crystal/resin composite layer 215. However, this can be prevented by the transparent plate 293 and the reflection light ray "B1" is not reflected at the interface between the array substrate 213 and the transparent plate 294 and absorbed by the black paint 222.

In the examples shown in FIGS. 15 and 16, the black matrix 252 are produced to be specular at the side of the array substrate 213 so as to reflect the light. Then, the light entering the thin film transistors 216 is reflected and it does not heat the display panel to deteriorate the display characteristic.

Figure 18:
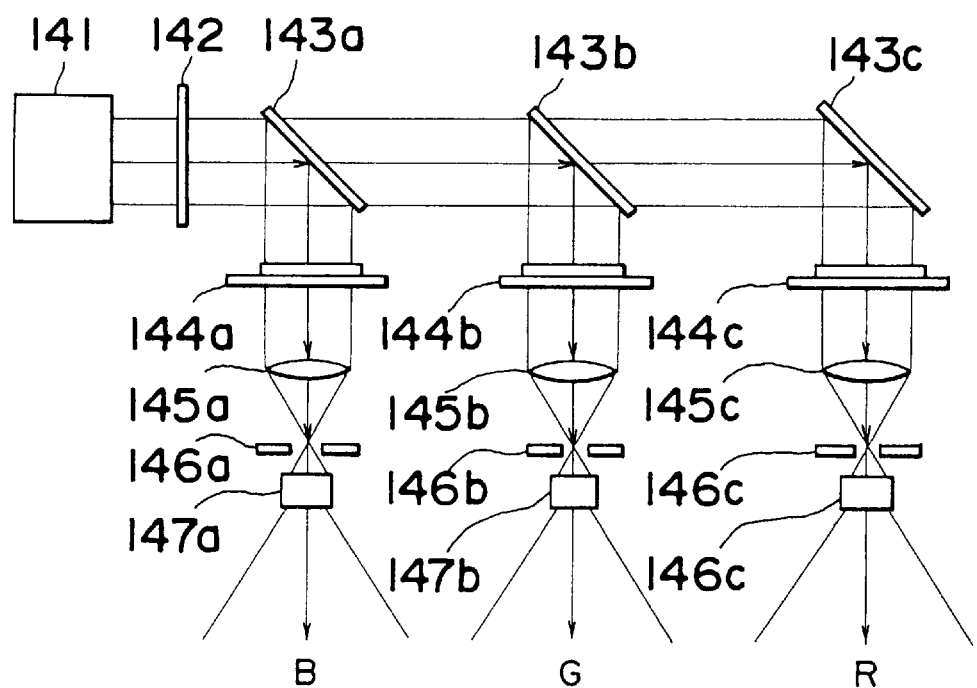
FIG. 18 is a schematic diagram of a projection display system of an embodiment of the present invention.

Display panels as explained above can be used as light valves for a projection display system. Next, projection type display systems according to the present invention are explained. FIG. 18 shows schematically a projection display system using three display panels 144a, 144b and 144c as light valves and three projection lenses therefor. It is noted here that components unnecessary for the explanation have been eliminated from the drawing. Reference numeral 141 denotes a light convergence optical system including a concave mirror and a light source. Preferably, the light source is a metal halide lamp or a xenon lamp. It is desirable that the lamp has an arc length as short as possible. In general, a xenon lamp has an arc length of 2 mm or less, and it can be used in the display system. However, it has a disadvantage of short life. A metal halide lamp used in this example has an arc length of 5 mm or less. The concave mirror and the F value of the projection lens can be designed to have appropriate specifications corresponding to the arc length of the lamp. For instance, the F value of the projection lens is set at about F8 when the arc length is 4 mm. Reference numeral 142 denotes a UVIR cutoff filter for transmitting only visible light, and reference numerals 143a, 143b and 143c denote dichroic mirrors for reflecting blue, green and red, respectively. The last dichroic mirror 143c may be replaced with by a reflection mirror. Reflection type display panels 144a, 144b, 144c are the display panels according to the present invention used as light valves. In the display panel 143c for red, the size of the droplets or the pores of the polymer network and the thickness of the liquid crystal/resin composite layer are larger than those of the other panels because the scattering characteristic decreases with increasing wavelength. The size can be controlled by the ultraviolet rays for polymerization or by the materials of the liquid crystal layer, and the thickness can be controlled according to the size of beads in the liquid crystal layer. Reference numerals 145a, 145b and 145c denotes a lens, reference numerals 147a, 147b and 147c denote a projection lens, reference numerals 146a, 146b and 146c denote an aperture, and these elements together from a projection optical system. The aperture 146 can be considered to be included in the projection lens because it determines the converging angle of the projection lens 145. For example, if the F value is large, the aperture size is considered to be small. However, the aperture 146 is displayed explicitly for illustrating the action of the projection. In order to improve the display contrast, it is preferable that the F value is large. However, this decreases the brightness of the display of white.

Next, the action of the display system is explained. Because the three optical modulation systems perform similar actions, only the optical system for blue is explained. First, a white light radiates from the conversion optical system 141, and the blue component of the white light is reflected by the dichroic mirror 143a, and it enters the display panel 144a. The display panel 144a modulates the light by the scattering and the transmission of the incident light according to the signals applied to the pixel electrodes as shown in FIGS. 1(a) and 1(b). The scattered light is shaded by the aperture 146a, while the parallel light or the light within a prescribed angle passes the aperture 146a and enlarged by the lens 147a to project an image on a screen (not shown). Similarly, the green and red components are modulated by the display panels 144b and 144c and are displayed on the screen. Thus, a color image is reproduced on the screen. If the transparent plates 293 and 294 are adhered to the display as shown in FIGS. 15 and 16 and the plates have a shape of convex lens, the projection optical system is constructed by taking the transparent plates into account.

Figure 19:
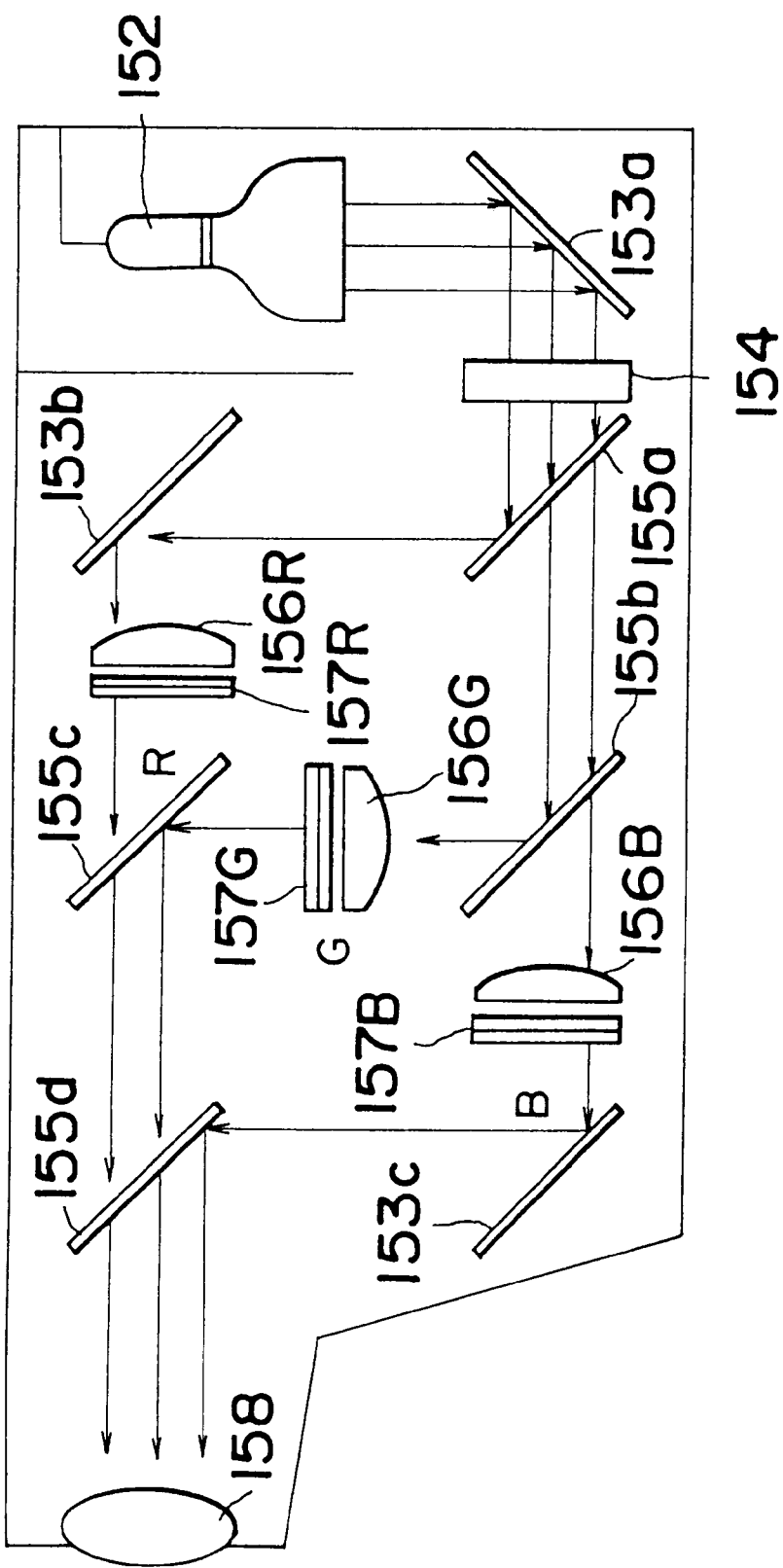
FIG. 19 is a schematic diagram of a projection display system of another embodiment of the present invention.

FIG. 19 shows a different projection display system wherein a single projection lens is used. Display panels 157R, 157G and 157B are display panels for red, green and blue according to the present invention. The light generated by a metal halide lamp 152 is reflected by a mirror 153a and enters a UVIR cutoff filter 154 to pass only visible light. Then, the light is separated by dichroic mirrors 155a and 155b into light beams of three wavelength ranges. The red, green and blue light beams enter field lenses 156R, 156G and 156B, which converge each light beams to enter into the display panels 157R, 157G and 157B. Then, the light beams modulated by the display panels 157R, 157G and 157B are synthesized by dichroic mirrors 157c and 157d, and enlarged by a projection lens 158 to be projected onto a screen (not shown).

Figure 20:
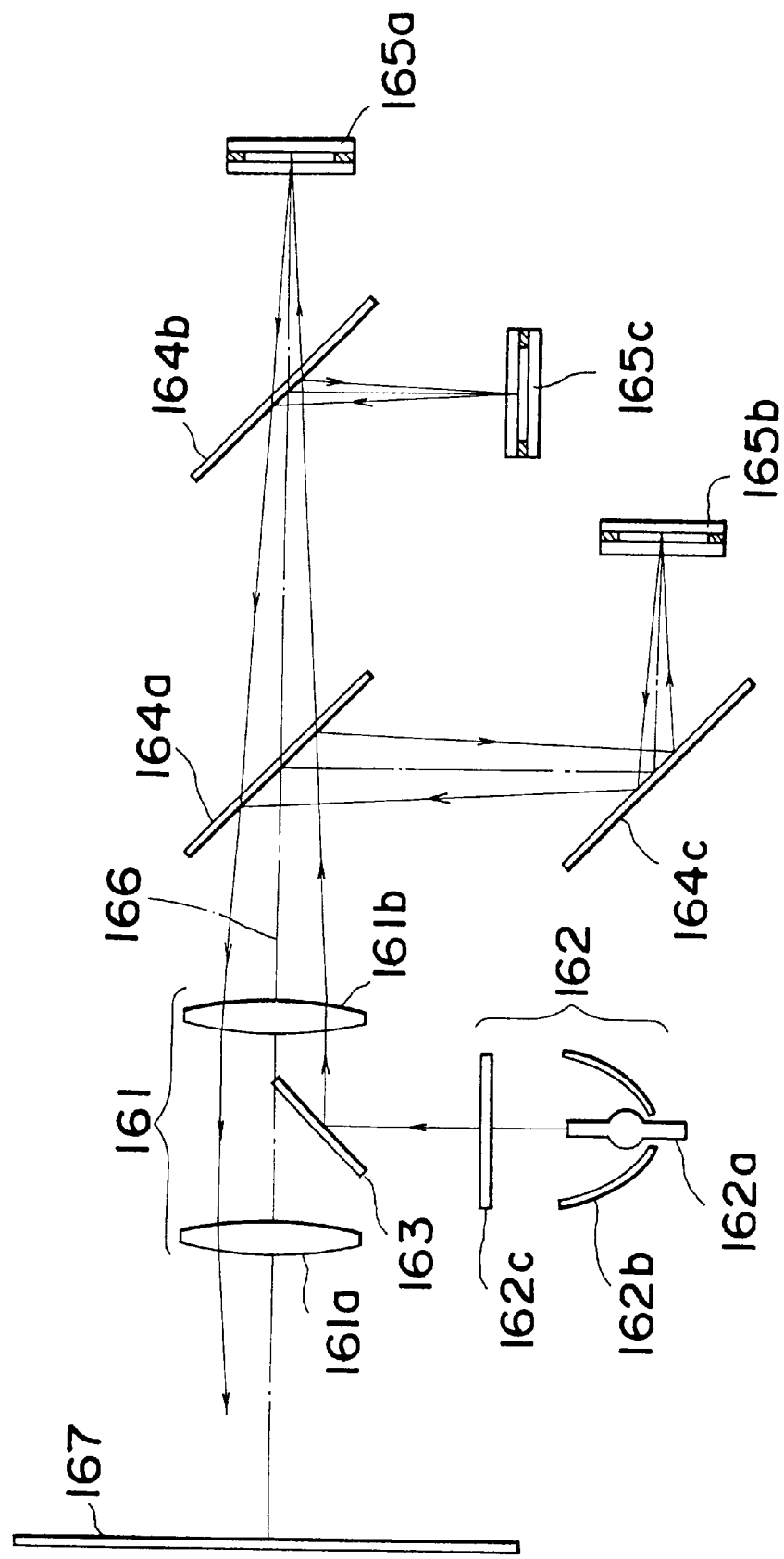
FIG. 20 is a schematic diagram of a projection type display system of a different embodiment of the present invention.

FIG. 20 shows a different projection display system wherein reflection type display of the present invention panels as shown in FIGS. 2(a), 2(b) or 9 are used. A light source 162 comprises a metal halide lamp 162a, a concave mirror 162b and a filter 162c. The concave mirror 162b is made of glass, and a multi-layer film for reflecting visible light and transmitting infrared and ultraviolet rays are deposited on a reflection surface of the mirror. The visible components included in the light emitted from the lamp 162a are reflected on the reflection surface of the concave mirror 162b, and infrared and ultraviolet components are removed by the filter 162c from the light reflected on the concave mirror 162b.

The projection lens 161 is comprised of a first lens group 161a disposed on the side of the display panels 165a, 165b, 165c and a second lens group 161b disposed on the side of a screen 167. Between the first and second lens groups 161a and 161b is provided a plane mirror 163. Scattered light emitted from a pixel located at the center of each display panel 165 is transmitted through the first lens group 161a, where a lower half of the light with respect to the optical axis 166 in the drawing is incident on the plane mirror 163, and the remaining light is incident on the second lens group 161b instead of the plane mirror 163. The normal of the plane mirror 163 is inclined at an angle of 45° with respect to the optical axis 166 of the projection lens 161.

The light emitted from the light source 162 is reflected on the plane mirror 163 and transmitted through the second lens group 161b to be incident on the display panels 165. Light reflected on the display panel 164 is transmitted through the first lens group 161a and the second lens group 161b in this order to reach the screen 167. The optical system is designed in such a manner that a light beam emitted from the center portion of the projection lenses 161 and directed along the optical axis 166 to the display panels 165 is incident on the liquid crystal layer of the panel approximately perpendicularly, i.e., in a telecentric manner. It is assumed here that display panels 165a, 165b and 165c are display panels for modulating red, green and blue.

Reference numerals 164a, 164b, and 164c denote dichroic mirrors which concurrently serve both as a color synthesis and as a color separation system. White light emitted from the light source 162 is reflected by the plane mirror 163 to be incident on the first group 161a of the projection lens 161. In the above case, unnecessary light components are cut off by the filter 162c having a half band width of 430 nm to 690 nm. Hereinafter, each optical band is represented by its half band width value. The dichroic mirror 164a reflects the green component and transmit the red and blue components. The green component is subjected to eliminate a band by the dichroic mirror 164c to be incident on the display panel 164b. The band of the green component is 510 to 570 nm. On the other hand, the dichroic mirror 164b reflects the blue component and transmits the red component. Similarly, the blue component is incident on the display panel 165c, while the red component is incident on the display panel 165a. The blue component has a band of 430 to 490 nm, while the red component has a band of 600 to 690 nm. Each display panel forms an optical image by changing the scattering state of light according to video signals. Optical images formed by the display panels 165a, 165b and 165c of the three colors are synthesized by the dichroic mirrors 164a and 164b and then enlarged and projected by the projection lens 161 on the screen 167. It is noted that bandwidths of the red, green and blue components have almost common values. Though dichroic mirrors are used in FIG. 20, dichroic prisms may also be used instead of dichroic mirrors.

By using the reflection type display panel 165a, 165b, 165c having a high contrast and a high numerical aperture, a high-brightness image display can be achieved. Furthermore, since no obstacle exists behind the display panel, the panel can be cooled easily. For instance, a forced air cooling from behind the panel can be easily utilized, or a heat sink or the like can be easily attached to the rear surface of the panel.

Because a projection display system uses display panels of the present invention, an image of high precision has high luminance and high contrast and can be projected on a screen of 200 inches or more.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A liquid crystal display panel comprising:
   a first substrate on which pixel electrodes arranged as a matrix and signal lines for applying signals to the pixel electrodes are formed;
   a second substrate on which a counter electrode is formed;
   an optical modulation layer interposed between said first and second substrates, said optical modulation layer being capable of forming an optical image due to a change of an optical scattering state thereof; and
   a light absorbing member formed on said signal lines, said light-absorbing member comprising a resin material capable of absorbing light scattered in said optical modulation layer.

2. The liquid crystal panel according to claim 1, wherein said optical modulation layer comprises a liquid crystal/resin composite including a liquid crystal component and a resin component, said optical modulation layer has a thickness between 5 and 25 µm, a ratio of the liquid crystal component in the composite is set to be between 50 and 85 wt %, the resin component of the composite comprises a photosetting acrylic resin, and the liquid crystal component of the composite comprises a nematic liquid crystal.

3. A liquid crystal panel comprising:
   first and second electrode substrates, at least one of the first and second electrode substrates being made of a transparent material;
   an optical modulation layer interposed between said first and second electrode substrates, said optical modulation layer being capable of forming an optical image due to a change of an optical scattering state;
   a first light-absorbing member formed on at least one of said first and second electrode substrates on a plane in contact with said optical modulation layer, said light-absorbing member being capable of absorbing light scattered in said optical modulation layer;
   a transparent plate;
   an optical coupling layer coupling optically said transparent plate to said at least one of said first and second electrode substrates; and
   a second light-absorbing member formed in an area of said transparent plate in which light effective for displaying an image does not propagate.

4. The liquid crystal panel according to claim 3, wherein said transparent plate comprises a concave lens.

5. The liquid crystal panel according to claim 3, wherein said optical modulation layer comprises a liquid crystal/resin composite including a liquid crystal component and a resin component, said optical modulation layer has a thickness between 5 and 25 µm, a ratio of the liquid crystal component in the composite is set to be between 50 and 85 wt %, the resin component of the composite comprises a photosetting acrylic resin, and the liquid crystal component of the composite comprises a nematic liquid crystal.

6. The liquid crystal display panel according to claim 3, wherein parameters of the panel are such that a following relation:

$$t \geq \frac{d}{4}\sqrt{(n^2 - 1)}$$

holds where "n" denotes an index of refraction of said transparent plate, "t" denotes a total thickness of said transparent plate in units of millimeters and said at least one of said first and second electrode substrates at a center thereof, and "d" denotes a diagonal length of an effective display area of the liquid crystal panel in units of millemeters.

7. A liquid crystal display panel comprising:
   a first substrate above which reflection electrodes arranged as a matrix are formed, switching elements connected to the reflection electrodes being formed between the reflection electrodes and said first substrate;
   a second substrate on which a counter electrode and a dielectric film made of an inorganic material so as to have an anti-reflection function are formed;
   a liquid crystal layer interposed between said first and second substrates; and
   a light-shielding film formed between the reflection electrodes capable of preventing light from entering from said liquid crystal layer to the switching elements.

8. The liquid crystal panel according to claim 7, wherein said reflection electrodes are made of a metallic material, said reflection electrodes are formed on electrically insulating films formed on the switching elements, said liquid crystal layer comprises a liquid crystal/resin composite including a liquid crystal component and a resin component, said liquid crystal layer has a thickness between 5 and 25 µm, a ratio of the liquid crystal component in the composite is set between 50 and 85 wt %, the resin component of the composite comprises a photo setting acrylic resin, and the liquid crystal component of the composite comprises a nematic liquid crystal.

9. The liquid crystal panel according to claim 7, wherein said dielectric layer is made of one of aluminum oxide ($Al_2O_3$), yttrium oxide ($Y_2O_3$) and silicon oxide (SiO).

10. A projection type liquid crystal display comprising:
    a display panel comprising: a first substrate on which pixel electrodes arranged as a matrix are formed, a second substrate on which a counter electrode is formed, an optical modulation layer interposed between said first and second substrates, said optical modulation layer being capable of forming an optical image due to a change of an optical scattering state, and a light-absorbing film formed on a light-shielding layer formed on said counter electrode and being in contact with said optical modulation layer;

a light source for generating a light beam;

an optical system for guiding the light beam generated by said light source to said display panel; and a projection device for projecting light modulated by said display panel.

11. The display according to claim 10, wherein said light-absorbing member comprises a film made of a resin including pigments capable of absorbing light modulated by said optical modulation layer.

12. The display according to claim 9, wherein said optical modulation layer comprises a liquid crystal/resin composite including a liquid crystal component and a resin component, said optical modulation layer has a thickness between 5 and 25 μm, a ratio of the liquid crystal component in the composite is set to be between 50 and 85 wt %, the resin component of the composite comprises a photosetting acrylic resin, and the liquid crystal component of the composite comprises a nematic liquid crystal.

13. A projection type liquid crystal display comprising:

a display panel comprising: a first substrate above which reflection electrodes arranged as a matrix are formed, switching elements connected to the reflection electrodes being formed between the reflection electrodes and said first substrate, a second substrate on which a counter electrode and a dielectric film made of an inorganic material so as to have an anti-reflection function are formed, a liquid crystal layer interposed between said first and second substrates, and a light-shielding film formed between the reflection electrodes capable of preventing light from entering from said liquid crystal layer to the switching elements;

a light source for generating a light beam;

an optical system for guiding the light beam generated by said light source to said display panel; and a projection device for projecting light modulated by said display panel.

14. The display according to claim 12, wherein said reflection electrodes are made of a metallic material, said reflection electrodes are formed on electrically insulating films formed on the switching elements, said liquid crystal layer comprises a liquid crystal/resin composite including a liquid crystal component and a resin component, said optical modulation layer has a thickness between 5 and 25 μm, a ratio of the liquid crystal component in the composite is set to be between 50 and 85 wt %, the resin component of the composite comprises a photosetting acrylic resin, and the liquid crystal component of the composite comprises a nematic liquid crystal.

15. A projection type liquid crystal display comprising:

a plurality of optically addressed display panels, each of the display panels comprising: a first substrate on which an electrically conducting layer is formed, a second substrate on which a transparent counter electrode and at least one dielectric layer are formed so as to form an anti-reflection layer, an optical modulation layer capable of forming an optical image due to a change of an optical scattering state interposed between said first and second substrates, and a light absorbing member formed on at least one of said first and second substrates on a plane in contact with said optical modulation layer, the light-absorbing member being capable of absorbing light scattered by said optical modulation layer;

a light source for generating a light beam;

an optical system for guiding the light beam generated by said light source to said display panels; and a projection device for projecting light modulated by said display panels.

16. A projection type liquid crystal display comprising:

a plurality of display panels, each of said display panels comprising: a first substrate having thereon pixel electrodes arranged as a matrix and signal lines for applying signals to the pixel electrodes, a second substrate on which a counter electrode is formed, an optical modulation layer interposed between said first and second substrates, said optical modulation layer being capable of forming an optical image due to a change of optical scattering state, and a light-absorbing member formed on said signal lines;

wherein said plurality of display panels comprise a first display panel for modulating red, a second display panel for modulating green and a third display panel for modulating yellow;

wherein said optical modulation layer of each of said plurality of display panels comprises a liquid crystal component and a resin component;

wherein said optical modulation layer of said first display panel has a condition selected from the group consisting of 1) a droplet size of the liquid crystal component being larger than the droplet size of the liquid crystal component of said second and third display panels, and 2) a pore size of the resin component being larger than the pore size of the resin component of said second and third display panels;

a light source for generating a light beam;

an optical system for guiding the light beam generated by said light source to said display panels; and a projection device for projecting a light modulated by said display panels.

17. A liquid crystal display panel comprising:

a first substrate on which pixel electrodes are arranged as a matrix;

a second substrate on which a counter electrode is formed;

an optical modulation layer interposed between said first and second substrates, said optical modulation layer being capable of forming an optical image due to a change of an optical scattering state; and a light absorbing member for absorbing light scattered in said optical modulation layer, said light absorbing member being formed on said counter electrode to have an anti-reflection function.

18. A liquid crystal display panel comprising:

a first substrate on which pixel electrodes arranged as a matrix are formed;

a second substrates on which a counter electrode and a black matrix are formed;

an optical modulation layer interposed between said first and second substrates, said optical modulation layer being capable of forming an optical image due to a change of an optical scattering state; and a light-absorbing member formed on said black matrix, said light-absorbing member comprising a resin material capable of absorbing light scattered in said optical modulation layer.

19. The liquid crystal display panel according to claim 18, wherein said optical modulation layer comprises a liquid crystal/resin composite including a liquid crystal component and a resin component, said optical modulation layer has a thickness between 5 and 25 μm, the liquid crystal component of the composite is set to be between 50 and 85 wt %, the resin component of the composite comprises a photosetting acrylic resin, and the liquid crystal component of the composite comprises a nematic liquid crystal.

20. A liquid crystal display panel comprising:
a first substrate on which transparent pixel electrodes arranged as a matrix are formed;
a second substrate on which a counter electrode made of a transparent conductive material and at least one dielectric layer are layered so as to form an anti-reflection film;
an optical modulation layer interposed between said first and second substrates, said optical modulation layer being capable of forming an optical image due to a change of an optical scattering state; and
a light-absorbing member formed between the pixel electrodes for absorbing light scattered in said optical modulation layer.

21. The liquid crystal panel according to claim 20, wherein said light-absorbing member comprises a film made of a resin comprising pigments for absorbing light modulated by said optical modulation layer.

22. The liquid crystal panel according to claim 20 wherein:
said at least one dielectric film is made of an inorganic material of $Al_2O_3$, $Y_2O_3$ or SiO so as to form an anti-reflection layer;
said optical modulation layer has a thickness between 5 and 25 μm, and the liquid crystal component of the composite is set to be between 50 and 85 wt %; and
the at least one dielectric film has an optical thickness of about $\lambda/4$, and said transparent, electrically conducting material has an optical thickness selected from the group consisting of about $\lambda/2$ and about $\lambda/4$, where $\lambda$ denotes a main wavelength of incident light.

23. An optically addressed liquid crystal display panel comprising,
a first substrate having electrically conductive layers formed thereon;
a second substrate having thereon a transparent counter electrode and at least one dielectric layer layered so as to form an anti-reflection film;
an optical modulation layer interposed between said first and second substrates, said optical modulation layer being capable of forming an optical image due to a change of an optical scattering state; and
a light-absorbing member formed on at least one of said first and second substrates on a plane in contact with said optical modulation layer, said light-absorbing member being capable of absorbing light scattered in said optical modulation layer.

24. The panel according to claim 23, wherein said light-absorbing member is formed in stripe patterns.

25. A projection type liquid crystal display comprising:
a plurality of a display panels each comprising: a first substrate having reflection electrodes arranged thereon as a matrix, a second substrate having a counter electrode and at least one dielectric layer made of an inorganic material and layered thereon so as to form an anti-reflection film, an optical modulation layer interposed between said first and second substrates, said optical modulation layer being capable of forming an optical image due to a change of an optical scattering state, and a light absorbing member formed on at least one of said first and second substrates on a plane in contact with said optical modulation layer for absorbing light scattered in said optical modulation layer;
a light source for generating a light beam;
an optical system for guiding the light beam generated by said light source to said display panel; and
a projection device for projecting light modulated by said display panel.

26. The display according to claim 25, wherein said light-absorbing member comprises a film made of a resin including pigments capable of absorbing light modulated by said optical modulation layer.

27. A projection type liquid crystal display comprising:
a plurality of optically addressed display panels, each of said display panels comprising: a first substrates having reflection electrodes arranged thereon as a matrix and signal lines thereon for applying signals to the reflection electrodes, a second substrate having a counter electrode and at least one dielectric layer thereon so an to form an anti-reflection layer, an optical modulation layer interposed between said first and second substrates, said optical modulation layer being capable of forming an optical image due to a change of an optical scattering state, and a light-absorbing member formed between said reflection electrodes, said light-absorbing member being capable of absorbing light scattered in said optical modulation layer;
a light source for generating a light beam;
an optical system for separating the light beam generated by said light source into a plurality of optical paths so as to guide the light beam to said display panels and for synthesizing light modulated by said display panels into a single optical path; and
a projection device for projecting light synthesized by said optical system.

28. A projection type liquid crystal display comprising:
a plurality of display panels, each of said display panels comprising: a first substrate having pixel electrodes arranged as a matrix and signal lines for applying signals to the pixel electrodes formed thereon and a light-absorbing member made of resin and formed on the signal lines, a second substrate having a counter electrode, and an optical modulation layer interposed between said first and second substrates, said optical modulation layer being capable of forming an optical image due to a change of an optical scattering state;
a light source for generating a light beam;
an optical system for separating the light beam generated by said light source into a plurality of optical paths and guiding the light beam to said display panels; and
a plurality of projection devices for projecting the light modulated by said plurality of display panels.

29. The display according to claim 28, wherein said optical modulation layer comprises a liquid crystal/resin composite including a liquid component and a resin component, said optical modulation layer has a thickness between 5 and 25 μm, the liquid crystal component in the composite is set to be between 50 and 85 wt %, the resin component of the composite comprises a photosetting acrylic resin, and the liquid crystal component of the composite comprises a nematic liquid crystal; and
the at least one dielectric film is made of $Al_2O_3$, $Y_2O_3$ or SiO and has an optical thickness of about $\lambda/4$, and said counter electrode further comprises a transparent, electrically conducting film that has an optical thickness of about $\lambda/2$ and $\lambda/4$, where $\lambda$ denotes a rain wavelength of incident light.

* * * * *